(12) United States Patent
Gould et al.

(10) Patent No.: US 8,850,460 B1
(45) Date of Patent: *Sep. 30, 2014

(54) TECHNIQUES FOR PERFORMING A REMOTE PROCEDURE CALL USING REMOTE PROCEDURE CALL CONFIGURATION INFORMATION

(71) Applicant: EMC Corporation, Hopkinton, MA (US)

(72) Inventors: Christopher M. Gould, Lunenburg, MA (US); Peter J. McCann, Mason, NH (US)

(73) Assignee: EMC Corporation, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/020,291

(22) Filed: Sep. 6, 2013

Related U.S. Application Data

(63) Continuation of application No. 12/286,433, filed on Sep. 29, 2008, now Pat. No. 8,555,297.

(51) Int. Cl.
*G06F 13/00* (2006.01)

(52) U.S. Cl.
USPC ............................................. 719/330

(58) Field of Classification Search
CPC ................................. G06F 9/547; G06F 9/548
See application file for complete search history.

(56) References Cited

U.S. PATENT DOCUMENTS 7,246,358 B2 * 7/2007 Chinnici et al. .............. 719/315
8,065,690 B2 * 11/2011 Gokhale et al. .............. 719/330

* cited by examiner

*Primary Examiner* — Andy Ho
(74) *Attorney, Agent, or Firm* — Muirhead and Saturnelli, LLC

(57) ABSTRACT

Described are techniques for performing remote procedure calls (RPCs). An RPC API is described which provides for using an optimized technique and an unoptimized technique for performing RPCs. The optimized technique includes a client container performing a call to obtain RPC configuration information which is then stored by the client container and may be used by the client container in connection with multiple RPC invocations. Techniques are also described for communicating parameter information between containers executing in different address spaces by forming parameter information on the client side using embedded lists, encoding the parameter information on the client side prior to transmission to the server, and transmitting the encoded parameter information to the server which determines output parameters and returns the output parameters to the client.

20 Claims, 27 Drawing Sheets

```
rpc_register(&rpc_object, /* object to track information about this RPC */
    rpc_function); /* function to register. This parameter identifies the name of function which
        is included in the list of registered RPCs for a particular container. */
```

```
rpc_unregister(&rpc_object); /* RPC object previously registered using rpc_register */
```

360 — rpc_call SLOW(ic_id, /* container identifier of remote container */
NAME, /* string of RPC name in server being called */
input_args, /* RPC input arguments */
output_args, /* RPC output arguments */
&rpc_status_rv /* status of RPC call */
)

370 — rpc_lookup( ic_id, /* container identifier of remote container */
rpc_name, /* name of RPC function */
&rpc_remote_addr_rv, /* address of RPC object in remote container */
&state_id_rv /* current global RPC state id of remote container */
)

380 — rpc_call FAST(ic_id, /* container identifier of remote container */
state_id, /* global state id of remote container */
remote_rpc_addr, /* address of RPC object in remote container */
input_args, /* RPC input arguments */
output_args, /* RPC output arguments */
&rpc_status_rv /* status of RPC call */
)

FIGURE 4

```
rpc_lookup( ic_id,   /* container identifier of remote container */
            rpc_name, /* name of RPC function                    */
            &rpc_remote_addr_rv, /* address of RPC object in remote container */
            &state_id_rv   /* current global RPC state id of remote container */
          )

/* execute API inputs include lookup command code, rpc_name; */
/* execute API output params include rpc_remote_addr_rv and state_id_rv */
/* send lookup request to server denoted by ic_id using execute API. */
status = execute(ic_id, RPC_CMD, input_buffer = (LOOKUP_CMD, rpc_name),      ─→752
                 output_buffer= (&rpc_remote_addr_rv, &state_id_rv));

if (status indicates server is not present) then  /* examine return status from lookup request */
    return PROTOCOL_ERROR ──→754
else if (status indicates rpc not found) then
    return RPC_NOT_FOUND──→756
else return SUCCESS──→758
```

```
rpc_call SLOW(ic_id, /* container identifier of remote container */
              NAME, /* string of RPC name in server being called */    ⎫
              input_args, /* RPC input arguments */                    ⎬ 860
              output_args, /* RPC output arguments */                  ⎪
              &rpc_status_rv /* status of RPC call */                  ⎭
             )
{
    /* send RPC call request to server denoted by ic_id using execute API. */
    /* execute API inputs include call SLOW command code, NAME, input_args; */
    /*execute API output params include output_args and rpcs_status_rv */
852 ——— status = execute(ic_id, RPC_CMD,
                          input_buffer= (SLOW_CMD, NAME, input_args),
                          output_buffer =(output_args, rpc_status_rv));

854 ——→ return status;
}
```

FIGURE 14

TECHNIQUES FOR PERFORMING A REMOTE PROCEDURE CALL USING REMOTE PROCEDURE CALL CONFIGURATION INFORMATION

This application is a continuation of U.S. patent application Ser. No. 12/286,433 (now U.S. Pat. No. 8,555,297), filed on Sep. 29, 2008, entitled TECHNIQUES FOR PERFORMING A REMOTE PROCEDURE CALL USING REMOTE PROCEDURE CALL CONFIGURATION INFORMATION, which is incorporated by reference herein in its entirety.

BACKGROUND

1. Technical Field

This application generally relates to code execution, and more particularly to techniques used for communicating between different code modules.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

Code modules that execute on a data storage system, as well as other systems, may use a variety of different techniques for inter-module communications. An environment in which the code executes may provide a facility for such inter-module communication. It may be desirable to utilize a flexible and efficient communication model and facility allowing messages to be exchanged between executing code modules.

SUMMARY OF THE INVENTION

In accordance with one aspect of the invention is a method for performing a remote procedure call comprising: sending a first request from a client container to a server container to obtain remote procedure call configuration information identifying a registered remote procedure call in said server container; sending said remote procedure call configuration information from said server container to said client container, said remote procedure call configuration information including a state identifier and an identifier of a remote procedure call descriptor, said state identifier being associated with a configuration state of said remote procedure call configuration information at a first point in time when said first request is processed by said server container, said remote procedure call descriptor describing an instance of a remote procedure call object for said registered remote procedure call; storing, by said client container, said remote procedure call configuration information; sending, from said client container to said server container, a second request to perform said registered remote procedure call, said second request including said remote procedure call configuration information; and performing, by said server container, processing for said second request, said processing including successfully validating said identifier of said remote procedure call descriptor using said state identifier prior to performing said registered remote procedure call. The step of validating may include determining whether there has been a change in remote procedure call configuration of said server container since said first point in time. The step of validating may include comparing said state identifier to another state identifier representing the remote procedure call configuration of said server container at a second point in time when said server container is processing said second request. The client container may send a plurality of requests to said server container to perform said registered remote procedure call, each of said plurality of requests including said remote procedure call configuration information returned in response to said first request. The client container may retrieve said remote procedure call configuration information from a memory location in an address space of said client container. The identifier may be an address of an object in an address space of said server container. The object may include a field identifying an address of code to which control is transferred in response to receiving a request to perform said registered remote procedure call. The remote procedure call may be performed by transferring execution control to an address obtained from said remote procedure call descriptor. The client container may include code executing in a first address space and said server container includes code executing in a second address space different than said first address space. The first request may include a string identifying a name of said registered remote procedure call, and performing said first request may include accessing a list of remote procedure call descriptors to determine whether said string identifies a name of a registered remote procedure call of said server container.

In accordance with another aspect of the invention is a computer readable medium comprising executable code stored thereon for performing a remote procedure call, the computer readable medium comprising executable code stored thereon for: performing, by a client container, a first call using a first defined interface, said first call including a first parameter identifying a remote procedure call name, said first call causing a first request being sent from said client container to a server container; receiving, from said server container in response to said first request, remote procedure call configuration information identifying a registered remote procedure call in said server container, said remote procedure call configuration information including a state identifier and an identifier of a remote procedure call descriptor, said state identifier being associated with a configuration state of said remote procedure call configuration information at a first point in time when said first request is processed by said server container, said remote procedure call descriptor describing an instance of a remote procedure call object for said remote procedure call; caching, by said client container, said remote procedure call configuration information; and performing, by said client container, a plurality of second calls using a second defined interface, each of said second calls including second call parameters, said second call parameters including said state identifier, said identifier, and one or more remote procedure call parameters, wherein each of said second calls causes a second request to be sent from said client container to said server container to perform said remote procedure call. The computer readable medium may further comprise executable code for performing, by said server container, processing for said second request, said processing including successfully validating said identifier of said remote procedure call descriptor using said state identifier prior to performing said remote procedure call. An address of a routine for said remote procedure call may be included in a field of said remote procedure call descriptor, said server container retrieving said address and transferring control to said address to perform said remote procedure call. The computer readable medium may further comprise executable code for issuing, by said server container, a third call using a third defined interface prior to said first call and said second call, said third call registering said remote procedure call for said server container, said registering including creating and initializing said remote procedure call descriptor for said remote procedure call, said remote procedure call descriptor having an address in an address space of said server container. Unregistering the remote procedure call may cause a change in remote procedure call configuration information for said server container and causes said server container to update a configuration identifier indicating said change. The first defined interface and said second defined interface may be included in an application programming interface used in connection with performing remote procedure calls when said client container executes in user space and said server container executes in user space, when said client container executes in user space and said server container executes in kernel space, and when said client container executes in kernel space and said server container executes in user space.

In accordance with another aspect of the invention is a method for communicating information between containers executing in different address spaces comprising: providing a first container having a first address space and a second container having a second address space different from said first address space; performing a plurality of calls forming a runtime call chain, said runtime call chain including a first portion of calls in said first container and including a remaining second portion of calls in said second container, wherein a first called routine in said first container receives first parameter information from a calling routine in said first container, said first parameter information including data from said calling routine and other information from any calls above said calling routine in said runtime call chain, said first called routine forming a structure including second parameter information from said called routine and a pointer to said first parameter information, said first called routine calling a second called routine in said first container and passing said structure, or a pointer thereto, to said second called routine, said first parameter information and said second parameter information being propagated to other subsequently called routines in said first portion of calls in said runtime call chain for transmission to said second container; encoding aggregate parameter information from said first portion of calls, said aggregate parameter information being stored in a hierarchical structure constructed as parameter information is propagated down said first portion of calls in said runtime call chain. The step of encoding may include marshalling the aggregate parameter information for said first portion of calls into a contiguous data area in a serialized form, communicating information from said contiguous data area in said serialized form to said server container, and receiving a response from said server container. The response may include output data and output data descriptors describing said output data. A third called routine in said second container may receive third parameter information from a second calling routine. The third called routine may remove data from said third parameter information used in its processing and pass a pointer to a remaining portion of said third parameter information to a fourth called routine called by said third called routine. The remaining portion may include parameter information used by said fourth called routine and other routines subsequently called in said second portion. The output data and said output data descriptors in said response may be in said serialized form which is decoded by unmarshalling the output data and said output data descriptors into a decoded form having a hierarchical structure. The hierarchical structure may include, for each routine in said first portion of said call chain, an embedded list of output information used by said each routine, said embedded list being removed by said each routine prior to propagating remaining output information from said response to other routines above said each routine in said call chain. The aggregate parameter information may include input data, input data descriptors and output data descriptors used by said server container in storing output data.

BRIEF DESCRIPTION OF THE DRAWINGS

Features and advantages of the present invention will become more apparent from the following detailed description of exemplary embodiments thereof taken in conjunction with the accompanying drawings in which:

FIG. 3 is an example illustrating a server-side API for use in connection with the techniques herein;

FIG. 4 is an example illustrating a client-side API for use in connection with the techniques herein;

FIGS. 7, 9, 10, 11 and 12 are examples illustrating processing that may be performed by a server container in an embodiment in accordance with techniques herein;

FIGS. 13 and 14 are examples illustrating processing that may be performed by a client container in an embodiment in accordance with techniques herein;

DETAILED DESCRIPTION OF EMBODIMENT(S)

Figure 1:
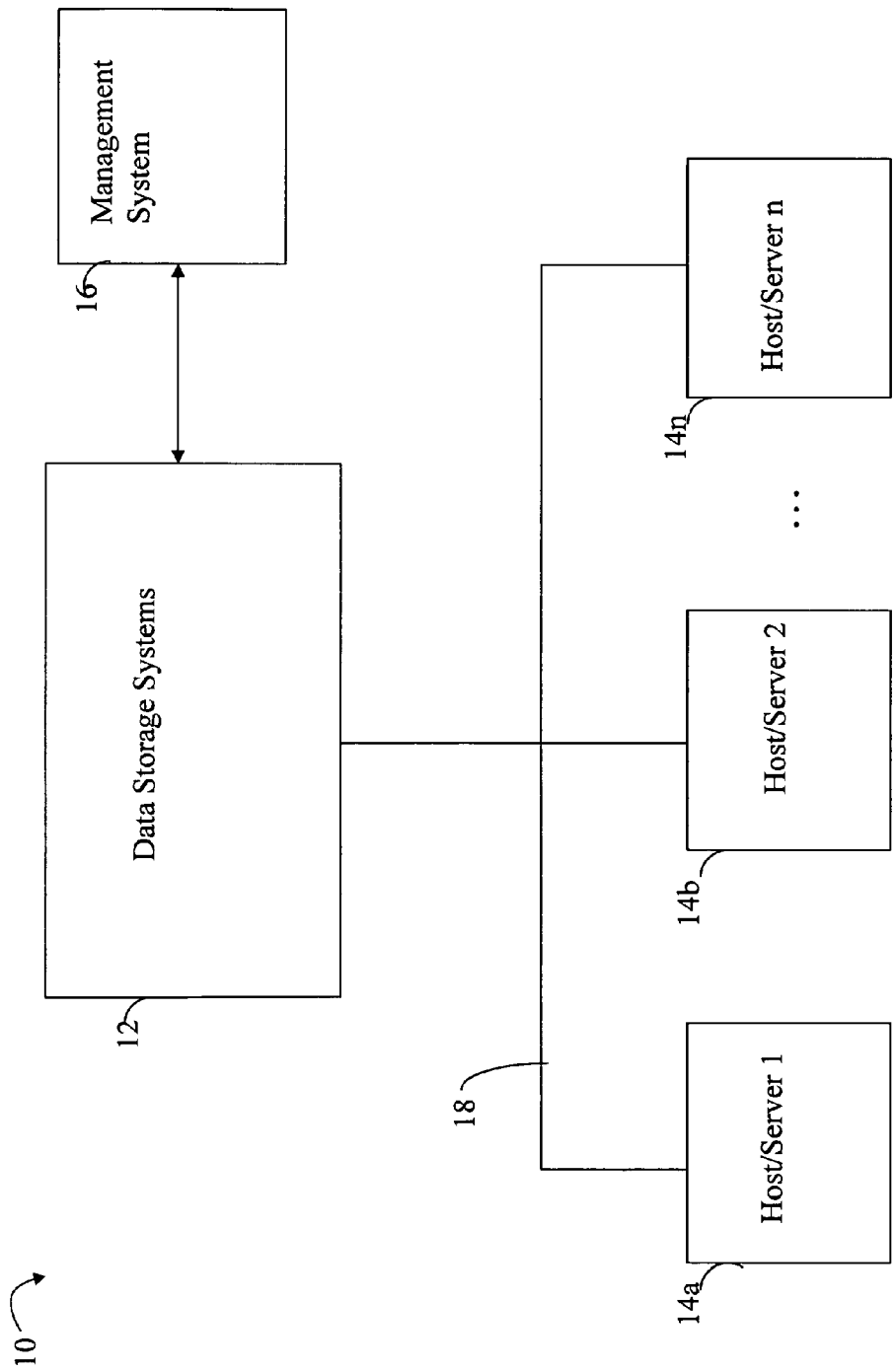
FIG. 1 is an example of an embodiment of a system that may utilize the techniques described herein.

With the growing popularity of all types of data storage devices, there is also a growing demand for software and features for data storage devices. However, developing software components for the devices is a difficult task because storage devices operate under constraints which at least in some cases are distinct or prioritized differently from those imposed on other types of computing systems.

For example, data storage devices require solutions to different sets of problems. A wide variety of data storage hardware solutions are available in the market. The solutions require significant efforts from software developers to provide high performance and reliability and other desired storage features and to integrate them with software solutions that would present to the end-customers easy and friendly user-interfaces. In addition, providers of hardware solutions are challenged to provide reasonable hardware-to-software interface mechanisms.

In many cases these constraints have resulted in providing largely static and non-expandable programming environments for data storage devices. The programming environments for these devices also tend to lack a common or standard interface to handle the integration of software components in a data storage environment. Thus, the creation of component-oriented software is rendered difficult and becomes a custom solution. Accordingly, conventional programming and testing environments for such devices present a substantial obstacle to software developers for such devices. Adding functionality to the operating system of a storage device can be difficult. Adding the same functionality to a storage device having a different operating system may require in general not only a different set of function calls and programming methods, but a different programming environment altogether.

Examples of conventional methods providing platform independence include the CORBA architecture and Sun Microsystems' Java. A CORBA architecture employs a middle layer called Object Request Broker ("ORB") to facilitate integration of software objects. The middle layer requires memory and a CPU's processing power.

A conventional Java architecture employs a virtual machine which provides platform independence at run-time. A virtual machine facilitates different object components to find each other, and the object components interact with each other via the virtual machine. Because object components interact and execute via the virtual machine versus execution of native code of the underlying processor, the processing speed is noticeably slowed down in a Java architecture. In addition, the virtual machine requires a large amount of memory and only executes code in user space. Furthermore, a software developer is required to use the Java language, and thus needs to expend a large amount of time and effort to become versatile in using a Java system. In addition, a large amount of legacy code written in non-Java language becomes unavailable in a Java architecture.

It is desirable to have flexible and platform independent programming environments for storage devices, especially given the growing demand for storage devices having a variety of different data storage system environments.

As described at least in part below, a storage software platform architecture can be provided that converges and leverages existing platform capabilities and technologies with other assets to provide a sustainable advantage.

In at least some implementations the architecture allows developers to focus on the customer experience and quality, improved product scalability, reliability, and availability, innovation in response to customer need, development of best of breed products and solutions, product line breadth, and enterprise and data center technologies. In at least some implementations the architecture also facilitates development and/or improvement in key areas such as convergence and leverage, ease of use, channel readiness, consistency and flexibility, application awareness, storage solutions and services, success at the lower end of the market, and efficiency, productivity, and focus of development resources.

In at least one aspect, the architecture is or includes a scalable, common architecture that can be extended across many technical and industry dimensions, and that takes into account that performance considerations vary, that availability and quality concerns may be high but have different complexities, that security is constant (but with perimeter versus internal security priorities varying), and that many different topologies exist. In at least one implementation, the architecture is or includes a unified architecture for integrated management of network attached storage (NAS), and object and storage block services.

The architecture may include features such as openness, application awareness, ease of use and management, partner enablement, scaling, globalization, enhanced platform architecture, and enhanced availability and reliability. Openness may rely on and/or leverage proprietary and third party technologies for accessibility and user interface. Application awareness may include automated discovery, application provisioning, and self-management. Ease of use and management may include a unified user experience, total lifecycle coverage, self-management, and active communities. Partner enablement may include features that facilitate sales channels and OEM arrangements. Scaling may include a range from small and medium size businesses to enterprise, and may include scaling up and scaling out. Globalization may include fully internationalized systems, with localized user interface screens and behavior. Enhanced platform architecture may include modular building blocks and well defined interfaces. Enhanced availability and reliability may include fault domains and autonomous management.

At least one implementation of the architecture takes into account that, from a high level perspective, many different storage platforms have many of the same features, such as moving data from one I/O chip to memory to another I/O chip, high availability, clustering, peer to peer replication, and drive management, and such platforms also support similar interface protocols, transformations, and methods. However, if such platforms have significantly varying implementations and external interfaces, and little commonality, development involves significant duplication of functionality and work, and it can be difficult to move technology or techniques from platform to platform, share or reuse technology or techniques, combine technology or techniques from different platforms together or with new applications, or otherwise avoid doing the same work multiple times. For example, if a new feature or new standard is needed, the new feature or standard must be implemented separately for each platform.

A convergence-oriented common software environment (CSE) based on the architecture takes into account different base architectural assumptions, different terminology for similar concepts, different behaviors or expressions for similar features, different high availability, different clustering, scaling, and non destructive upgrade models, different wire protocols (e.g., replication, mainframe), and different management interfaces and look-and-feel interfaces. As a result, the environment takes into account different software environments, different base operating systems dictating hardware, and different hardware dictating base operating systems.

Thus, the common software environment enables mechanical commonality as a prelude to enabling architectural commonality, with the results that the value of developed technology increases, commonality increases, it takes less work to maintain the same base of functions or add features, flexibility increases, the ability to effect rapid change is improved, technology and techniques are freed from existing mechanical then architectural constraints, the ability to combine existing technology and techniques with new technology and techniques in new ways increases, lost opportunity costs are regained, resources are freed up to refactor and rationalize rather than rewrite or discard current technology or techniques, the underlying basics of technology is preserved, enabling virtualization, code is strengthened by preserving field experience, development, testing, and support are made more efficient, and reliability is improved.

Referring to FIG. 1, shown is an example of an embodiment of a system that may be used in connection with performing the techniques described herein. The system 10 includes one or more data storage systems 12 connected to server or host systems 14a-14n through communication medium 18. The system 10 also includes a management system 16 connected to one or more data storage systems 12 through communication medium 20. In this embodiment of the system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the system 10. In one embodiment, the communication medium 20 may be a LAN connection and the communication medium 18 may be an iSCSI or fibre channel connection.

Each of the host systems 14a-14n and the data storage systems 12 included in the system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 20, a variety of different communication protocols may be used such as SCSI, Fibre Channel, iSCSI, and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In one embodiment, the hosts may communicate with the data storage systems over an iSCSI or a fibre channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16.

In one embodiment, the one or more data storage systems 12 of FIG. 1 may be an appliance with hardware and software for hosting the data storage of the one or more applications executing on the hosts 14a-14n. The appliance may include one or more storage processors and one or more devices upon which data is stored. The appliance may include software used in connection with storing the data of the hosts on the appliance and also software used in connection with techniques described in following paragraphs which are part of a common software environment (CSE).

In another embodiment, the data storage systems 12 may include one or more data storage systems such as one or more of the data storage systems, such as a data storage array, offered by EMC Corporation of Hopkinton, Mass. Each of the data storage systems may include one or more data storage devices, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12. It should be noted that each of the data storage systems may operate stand-alone, or may also be included as part of a storage area network (SAN) that includes, for example, other components such as other data storage systems. Each of the data storage systems may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment.

In such an embodiment in which element 12 of FIG. 1 is implemented using one or more data storage systems, each of the data storage systems may include code thereon for performing the techniques as described herein for the common software environment.

Servers or host systems, such as 14a-14n, provide data and access control information through channels to the storage systems, and the storage systems may also provide data to the host systems also through the channels. The host systems may not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. An LV or LUN (logical unit number) may be used to refer to the foregoing logically defined devices or volumes.

In following paragraphs, reference may be made to a particular embodiment such as, for example, an embodiment in which element 12 of FIG. 1 is an appliance as described above. However, it will be appreciated by those skilled in the art that this is for purposes of illustration and should not be construed as a limitation of the techniques herein.

The common software environment may include components described herein executing on each data storage system. Each of the data storage systems may have any one of a variety of different hardware and software platforms comprising a supported environment. For example, a first data storage system may include the common software environment with a first operating system and underlying hardware. A second data storage system may include the common software environment with a different operating system and different underlying hardware.

The common software environment includes a framework which may be implemented using APIs (application programming interfaces) and other code modules described herein. The APIs may implement the underlying functionality which varies with the different possible data storage system hardware and software platforms. As such, code may be written using the APIs so that the code is insulated from the underlying platform dependencies. The code may be executed on any data storage system utilizing the APIs regardless of the particular hardware and/or software platform of the data storage system. Additionally, the API may be written so that the code is allowed to execute in user space or kernel space as will be described in more detail herein. As such, the API may utilize the underlying primitives of the particular operating system or may also emulate functionality on an operating system lacking a particular feature. A code module using the API can also execute in user mode or kernel mode on a supported operating system. For example, a code module may make a first API call on a data storage system having a first operating system. For the first operating system, the API may implement the first API call utilizing the underlying primitives of the first operating system. The code module may also be executed on another data storage system having a second different operating system. For the second operating system, the first API call may be implemented using the primitives of the second operating system. The second operating system may not have a rich or full set of primitives so the API may emulate the necessary functionality of the primitives missing from the second operating system. The API uses the underlying operating system primitives where available and may otherwise synthesize or emulate the functionality necessary as may vary with the capabilities of each operating system. The code module may also execute in user or kernel mode on the first and second operating systems.

Figure 2:
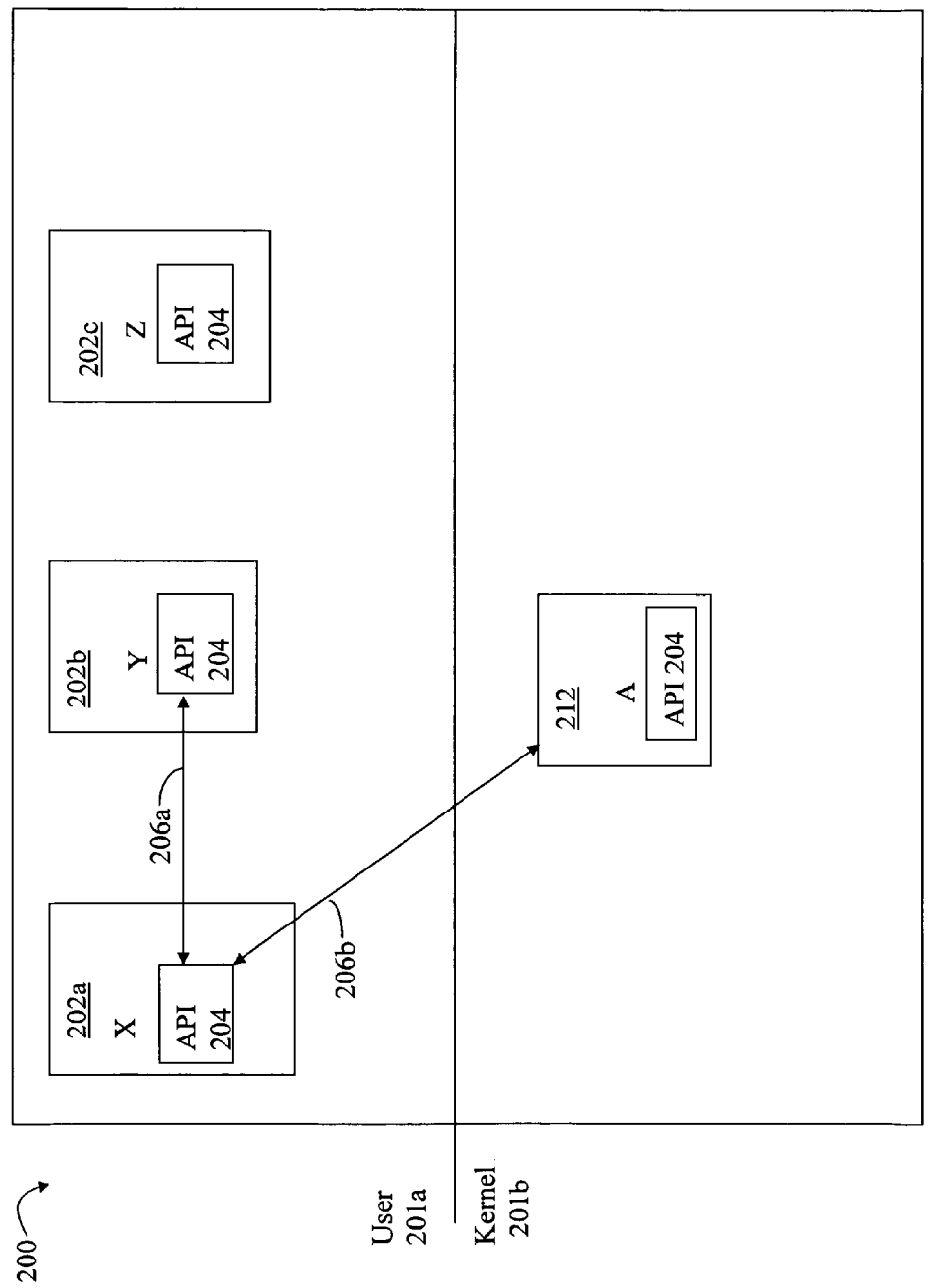
FIG. 2 is an example illustrating use of an API (application programming interface) in connection with a same code module that may be executed in user space and kernel space.

Referring to FIG. 2, shown is an example of components that may be executing on a processor node of a data storage system. If a data storage system has multiple processors, FIG. 2 illustrates components that may be executed by each such processor and includes user mode processes 202a, 202b and 202c and module 212 executing in kernel mode.

In the example 200, shown are user mode or user space 201a and kernel mode or kernel space 201b with different entities executing in each mode. As known in the art, code executing in the kernel mode may be characterized as a privileged execution mode with unrestricted access to system memory and hardware devices. Operating system code typically executes in kernel mode. In contrast, code executing in user mode may be characterized as a non-privileged mode of execution with restricted access to the system memory and hardware devices. In the example 200, elements 202a, 202b, and 202c may be user space processes or containers each having their own process address space. Thus, each user space process may be characterized as a single container or fault domain for fault containment purposes. In other words, each user process has its own state and can have an execution fault independent of, or isolated from, the other user processes. Thus, when one of the user processes experiences a fault, the other user processes may continue to execute without being affected by the fault. When a first of the executing processes is notified of the failing process, the first process may also notify other executing user and/or kernel space modules. The first process, or other currently executing user space process, may perform processing on behalf of the failing process and may perform cleanup associated with the failing process. In one embodiment, each user process can save information about its own state in an area of memory external to the process so that another instance of the same user process can perform cleanup, resume processing of the failed process, and the like. Additionally, a currently executing user space process may take steps in response to the failing process in accordance with any outstanding requests or processing being performed by the failing process on behalf of the currently executing process. For example, a first process may reissue its request previously made to a failing user process to another user process instance performing the same services or functionality as the failing process. In contrast, all code executing in the kernel mode may execute in the context of the same address space so that if a fault occurs during execution of a kernel mode process or thread, the operating system may experience a failure. Thus, all the code executing in kernel mode 201b may be characterized as a single kernel fault domain or container in contrast to each instance of 202a, 202b, and 202c executing in user mode 201a. Typically, code such as device drivers execute in kernel mode. As will be described in following paragraphs using the common software environment herein, a code module using APIs which implement user and kernel mode variations of necessary operations can execute in both user and kernel mode without modification to the original source code. In other words, for a given API call, any coding difference in implementing the API call when executing in user or kernel mode, different operating system, or other data storage system environment particular, may be embedded in the code of the API.

Described in following paragraphs is an API that may be used in connection with an inter-container (e.g inter address space) remote procedure call (RPC) facility where a first code module in a first container makes a remote procedure call to a second container. In following paragraphs, a first code module of the first container initiates a transaction or a command request and invokes a second code module in the second container using the RPC facility described herein. The first container may also be referred to as a client and the second container may be referred to as the server. The RPC mechanism and facility described herein includes an API with a client interface and a server interface for performing inter-container calls. In accordance with the techniques herein, the RPC mechanism and facility may be utilized when both client and server containers are user mode processes (U-U RPC) such as illustrated by 206a where X (as client) issues an RPC to Y (as server), when the client container executes in user mode and the server container executes in kernel mode (U-K RPC such as illustrated by 206b where X (as client) issues an RPC to A (as server), and when the client container executes in kernel mode and the server container executes in user mode (K-U RPC) such as also illustrated by 206b where A (as client) issues an RPC to X (as server).

In the example 200, each of the user mode processes 202a, 202b and 202c may use the same API 204. Code executing in the kernel space, such as software component or module 212, may also utilize the same API 204. The underlying details of implementing the functionality of the API call are embedded in the API code and not the code associated with 202a-202c and 212. Using the API, an embodiment may make a same set of functionality available to code that executes in both user and kernel space and leave the implementation details of the API calls to be included in the API code. The same API may be used for U-U RPCs, U-K RPCs, and K-U RPCs. Described in more detail in following paragraphs are techniques that may be used in connection with RPCs using a same API for both the client and server independent of whether the client and server are executing in user mode or kernel mode.

Figure 2A:
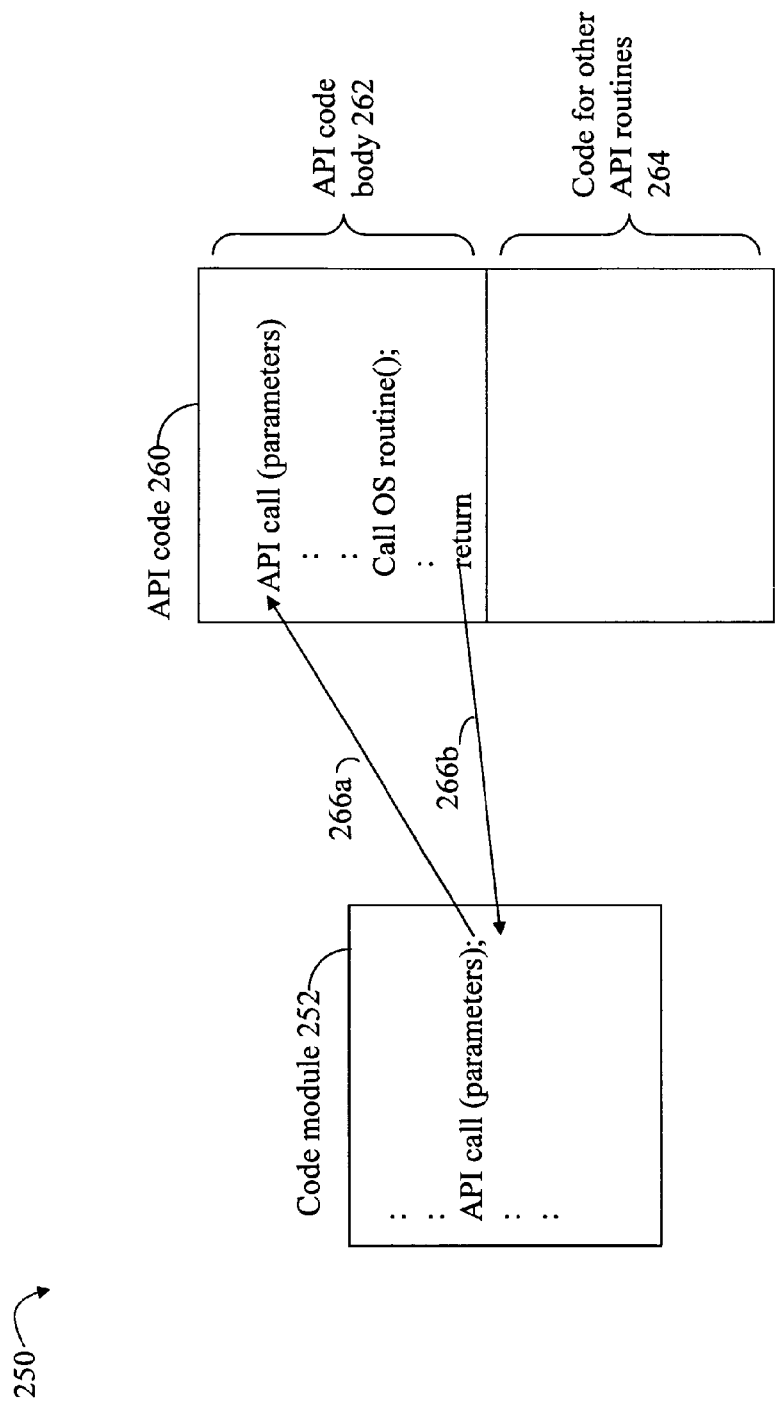
FIG. 2A is an example illustrating how code of the API may be used as a wrapper around platform-dependent calls to insulate a code module and promote portability in an embodiment using the techniques herein.

Referring to FIG. 2A, shown is an example illustrating general data flow between a code module and code of the API in accordance with techniques herein. The example 250 also illustrates the API code utilizing underlying native operating system functionality. The API code effectively provides a "wrapper" or layer of code around the underlying operating system calls that may be made to implement functionality of the particular API feature and operation. The API thus insulates the code module 252 from the different operating system specific calls that may be made to implement the API functionality providing portability of the code module across different operating systems that may be used in different execution environments. Similarly, the code module 252 is insulated from the coding differences that may occur in order to implement the API functionality in user and kernel mode. It should be noted that, as described herein, the underlying operating system functionality may vary with environment. Where a particular functionality needed to perform an operation in connection with the API is not directly available in a native operating system, the functionality may be emulated or synthesized using other functionality which is available in the native operating system.

The example 250 includes code module 252 which makes a call, "API call (parameters)", to code in the API. When the code module 252 is executed and the foregoing API call is made, control is transferred to an entry point in the API code 260 as indicated by 266a. The API code body 262 is executed and may invoke one or more operating system routines (OS routines) to implement the particular operation of the API call. Subsequently, control is returned to the code module 252 as indicated by 266b when the API code body 262 has completed. It should be noted that in the example 250, the code module 252 calls a routine in the API. The code module 252 may be code developed to run in user mode, kernel mode, and/or in any one of a variety of different environments each having a different operating system. The API routine may return to the calling routine once the called API routine has completed.

The example 250 illustrates a template in which functionality provided in the native environment, such as by an operating system, may be used by the API so that user or developer code invokes the API rather than calling the underlying operating system routines directly. Such code which invokes the API rather than directly invoking the underlying operating system routines provides portability of the developed code module across user and kernel mode as well as the different supported environments.

In one embodiment, the RPC facility may be build on top of, and utilize, a lower level intermodule communication mechanism (for inter-container communication) and technique to facilitate inter-module communication between two code modules executing in user mode (U-U communication between containers), or between a first code module that executes in user mode and a second code module that executes in kernel mode (U-K and K-U communication).

The intermodule communication techniques described in U.S. patent application Ser. No. 12/079,759 (the '759 application), filed Mar. 28, 2008, TECHNIQUES FOR INTER-USER-SPACE COMMUNICATION, and U.S. patent application Ser. No. 12/079,822 (the '822 application), filed Mar. 28, 2008, TECHNIQUES FOR USER SPACE AND KERNEL SPACE COMMUNICATION, both of which are incorporated by reference herein, may be used in connection with inter module communication between containers as needed to implement the techniques herein for RPCs regarding client and server code modules executing in user space and/or kernel space for U-U RPCs, U-K RPCs and/or K-U RPCs. As described above, an API may be defined which provides interfaces for use by clients and servers utilizing a remote procedure call interface in accordance with an embodiment using techniques herein. As described in the foregoing two patent applications, the API may also include interfaces defined and used to facilitate inter-module communication between two code modules in different containers executing in user mode (U-U communication), or between a first code module that executes in user mode and a second code module that executes in kernel mode (U-K and K-U communication). A first code module initiates a transaction or a command request and invokes a second code module. The first code module may also be referred to as a client and the second code module may be referred to as the server. In accordance with the techniques described in the foregoing two patent applications, U-U communications may be utilized when both client and server are user mode processes, U-K communications may be utilized when the client executes in user mode and the server executes in kernel mode, and K-U communications may be utilized when the client executes in kernel mode and the server executes in user mode. In connection with the techniques herein, the client may issue requests to a server to perform a remote procedure call and the appropriate intermodule communications may be used depending on the particular mode (e.g., user U or kernel K) of each of the client and server.

It should be noted that in connection with communications when both client and server execute in a same container or address space as with K-K communications or when both are included in the same U-space container, communications between such code modules may utilize local procedure calls available for communication within the same container or address space.

An embodiment of the RPC API described herein may be used for intracontainer calls (e.g., calls between code modules in the same container or address space) as well if supported. An embodiment may implement the RPC API by having code thereof determine whether an invocation of the RPC API is a call to a routine in the same or different address space (e.g., same or different container). If the API code determines that the call is being made to a routine in the same address space (e.g., called and calling routines in the same address space or container), then the API code may utilize a local procedure call, for example, to invoke the called routine rather than the execute API as described in the '822 and '759 patent applications. If the API code determines that call is being made to a routine in a different address space (e.g., different container), the API code may utilize the foregoing execute API as described in more detail elsewhere herein.

In accordance with the techniques described herein, a same code module may be executed using a communications model (such as the intermodule communications described above) and remote procedure call mechanism and facility embodied in the API in both user space and kernel space meaning that the same set of operations are available in user space and kernel space. The RPC mechanism as used by clients and servers may be performed by making calls into the API using a defined interface providing code portability across user and kernel mode in all supported environments. Furthermore, code of the RPC API may utilize and include the intermodule communications as described in the foregoing '759 and '822 patent applications.

As will be described in following paragraphs in accordance with techniques herein, an RPC interface is defined and includes a server interface whereby a first container, acting as a server, exports, exposes, registers, or otherwise publishes a named function or routine that may be called from a second container. The RPC interface also includes a client interface that may be used by the second container, acting as a client, in connection with issuing requests or commands to the first container to execute a registered RPC of the server container.

Referring to FIG. 3, shown is an example of a server-side API that may be used in connection with techniques herein for RPCs. Element 310 includes a first API that may be invoked by a server to register a named function or routine. Element 320 includes a second API that may be invoked by a server to unregister a named function or routine. By unregistering an RPC, the RPC is removed from the list of registered RPC routines which can be invoked by a client. In other words, a server unregistering an RPC is no longer providing remotely accessible services via the RPC call. Element 310 includes the first API call, rpc_register, that includes a first parameter, &rpc_object, which identifies the RPC object used to track information for the RPC. Rpc_register includes a second parameter, rpc_function, which identifies the name of the function being registered. Rpc_function may be a string. The RPC object identified by the first parameter, &rpc_object, may include information about the named registered RPC such as the address of the routine or function invoked. An example of an RPC object that may be used in an embodiment is described in more detail in following paragraphs.

The rpc_register API of 310 provides for registering an RPC having the name of the rpc_function parameter. Thus, a calling module specifies invocation of an RPC using the name of the rpc_function parameter. Additionally, an embodiment may also use the rpc_function parameter to identify the routine or body of code which is invoked as a result of the RPC. As an alternative, an embodiment may use two parameters rather than a single rpc_function parameter—a first to specify the name by which an RPC is registered and used by a calling routine, and a second to specify the name of the called routine within a code module to which control is transferred as a result of an RPC invocation. For example, a first container may register an RPC having the name "FUNC1" so that a calling container may use this name when issuing a remote procedure call. The first container may provide a routine "FUNC1_CODE( )" to which control is transferred as a result of invoking the RPC FUNC1.

Each container may have a list of one or more registered RPCs. A container may remove a registered RPC from its list of registered RPCs using the unregister API as illustrated in 320. The unregister API takes a single input parameter, &rpc_object, which is an RPC object of a previously registered RPC. The list of registered RPCs may be maintained in the context of the server container and its address space.

Referring to FIG. 4, shown is an example of a client-side API that may be used in connection with techniques herein for RPCs. The example 350 includes three APIs described in more detail below. Element 360 describes rpc_call SLOW. Element 370 describes rpc_lookup, Element 380 describes rpc_call FAST. Elements 360 and 380 illustrate two different APIs for two different versions of remote procedure calls that may be in used in an embodiment in accordance with techniques herein. Each invocation of 360 and 380 may be a request to a server container to perform the requested RPC. Element 370 may be characterized as an ancillary function that may be used in an embodiment in connection with the API of 380 as described below. Element 360 describing the rpc_call SLOW API includes the following parameters:

ic_id—identifying the remote container or server container including the RPC being invoked;

NAME—string identifying the RPC name in the server being called;

input_args—optional one or more RPC input arguments or parameters;

output_args—optional one or more RPC output arguments or parameters;

&rpc_status_rv—return value indicating the status of the RPC call.

A client may issue an rpc_call SLOW to request that the server perform processing associated with the registered RPC. The NAME parameter identifies a previously registered RPC by the server container identified by the parameter ic_id. Input_args and output_args, respectively, are the input and output parameters for the RPC. As will be described in more detail below, the rpc_call SLOW may be characterized as less efficient in terms of performance than the techniques used in implementing the rpc_call FAST, for example, when performing multiple RPC calls to the same RPC.

The rpc_lookup API and rpc_call FAST may be used together as an alternative to using the rpc_call SLOW to issue an RPC for a previously registered RPC. A client may first invoke the rpc_lookup API for an RPC that has been registered by a server container. Rpc_lookup may include the following parameters as illustrated by element 370:

ic_id—identifying the remote container or server container including the RPC being invoked;

rpc_name—string identifying the RPC name in the server being called;

&rpc_remote_addr_rv,—return value identifying the address of RPC object in the remote server container exporting the RPC; and &state_id_rv—current global RPC state id for the remote server container.

The first and second parameters, ic_id and rpc_name, are respectively similar to the first and second parameters of rpc_slow as described above. The third and fourth parameters are return values. Rpc_lookup issues a request from the client to the server container (denoted by ic_id) to perform a lookup in the remote server container's list of registered RPCs. In particular, a determination is made as to whether the remote server container's list of registered RPCs includes an RPC object associated with a named function denoted by the second parameter, rpc_name. If so, a pointer to the RPC object in the remote container's registered RPC list is returned as the third parameter. Additionally, state_id_rv is returned representing an identifier characterizing the global state or configuration of the remote server container with respect to its RPC configuration. If any RPC is unregistered from the remote container, the state_id value is accordingly modified to reflect this change. It should be noted that the embodiment described herein does not modify the state_id of the container if a new RPC is registered since such events may not be characterized as events of interest with respect to the RPC configuration and use of the state_id. The combination of the rpc_lookup and rpc_call FAST may be characterized as providing an optimized technique for performing remote procedure calls or requests issued from the client to the server. As such with this optimized technique as will be described in more detail below, the state_id value may be used to detect RPC configuration changes affecting the use of the optimized technique and may be used in connection with alerting a client to take an action in response.

As illustrated by element 380, rpc_call FAST may include the following parameters:

ic_id—identifying the remote container or server container including the RPC being invoked;

state_id—current global RPC state id for the remote server container;

rpc_remote_addr—value identifying the address of RPC object in the remote server container exporting the RPC;

input_args—optional one or more RPC input arguments or parameters;

output_args—optional one or more RPC output arguments or parameters;

&rpc_status_rv—return value indicating the status of the RPC call.

The parameters ic_id, input_args, output_args, and &rpc_status_rv are as described above in connection with rpc_call SLOW. The parameters state_id and rpc_remote_addr are as returned from a previous call to rpc_lookup. It should be noted that the rpc_call SLOW includes a second parameter NAME identifying the RPC by a named-string rather than the second and third parameters of the rpc_call FAST used to identify the RPC being invoked.

As described in more detail below, the rpc_call SLOW may perform a lookup in the server RPC's registered RPC list with each invocation prior to invoking the RPC. In contrast, these two operations of lookup and invoking the RPC are partitioned in accordance with a second technique for performing remote procedure calls using rpc_lookup and rpc_call FAST. With this latter technique, a client may perform a lookup in the remote server's registered RPC list to obtain the RPC object corresponding to the desired RPC to be invoked at a subsequent point in time. The client may cache this pointer to the RPC object identifying the registered RPC and utilize this cached pointer multiple times for subsequent multiple invocations of the RPC code in the server. The parameter state_id_rv returned from the rpc_lookup call may be passed to the server when the client issues an RPC request (via a subsequent rpc_call FAST invocation) as a way for the server to validate the remote_rpc_addr parameter. If an RPC configuration state change has occurred which could possibly affect the validity of the remote_rpc_addr parameter value, then the server does not use the remote_rpc_addr parameter value passed to it by the client (in the current rpc_call FAST invocation). Rather, the server accordingly alerts the client to perform another lookup using rpc_lookup and refresh its cached value of remote_rpc_addr. The more recent value of remote_rpc_addr may then be used by the client in subsequent calls. Thus, using the combination of rpc_lookup and rpc_call FAST provides for an optimized way of performing RPCs in contrast to using rpc_call SLOW which performs lookup processing with each invocation. In other words, using the optimized technique with rpc_lookup and rpc_call FAST, the client can perform lookup processing on the server once, cache the returned remote_rpc_addr, and reuse the remote_rpc_addr parameter identifying the RPC and code thereof. The remote_rpc_addr parameter may be used in connection with multiple subsequent RPC calls rather than perform lookup processing each time to identify the desired RPC object. The state_id parameter returned from the rpc_lookup API call may also be cached and passed to the server with each rpc_call FAST invocation for use by the server in validation and detection of server RPC configuration changes. The foregoing is described in more detail below.

It should be noted that each of the three APIs of FIG. 4 result in a request being issued to the identifier server to perform processing. The rpc_lookup API issues a remote request to the server to obtain information regarding a particular registered RPC. The information from the rpc_lookup may be used to facilitate one or more subsequent processing requests for additional remotely performed services by the registered RPC code of the server.

Figure 5:
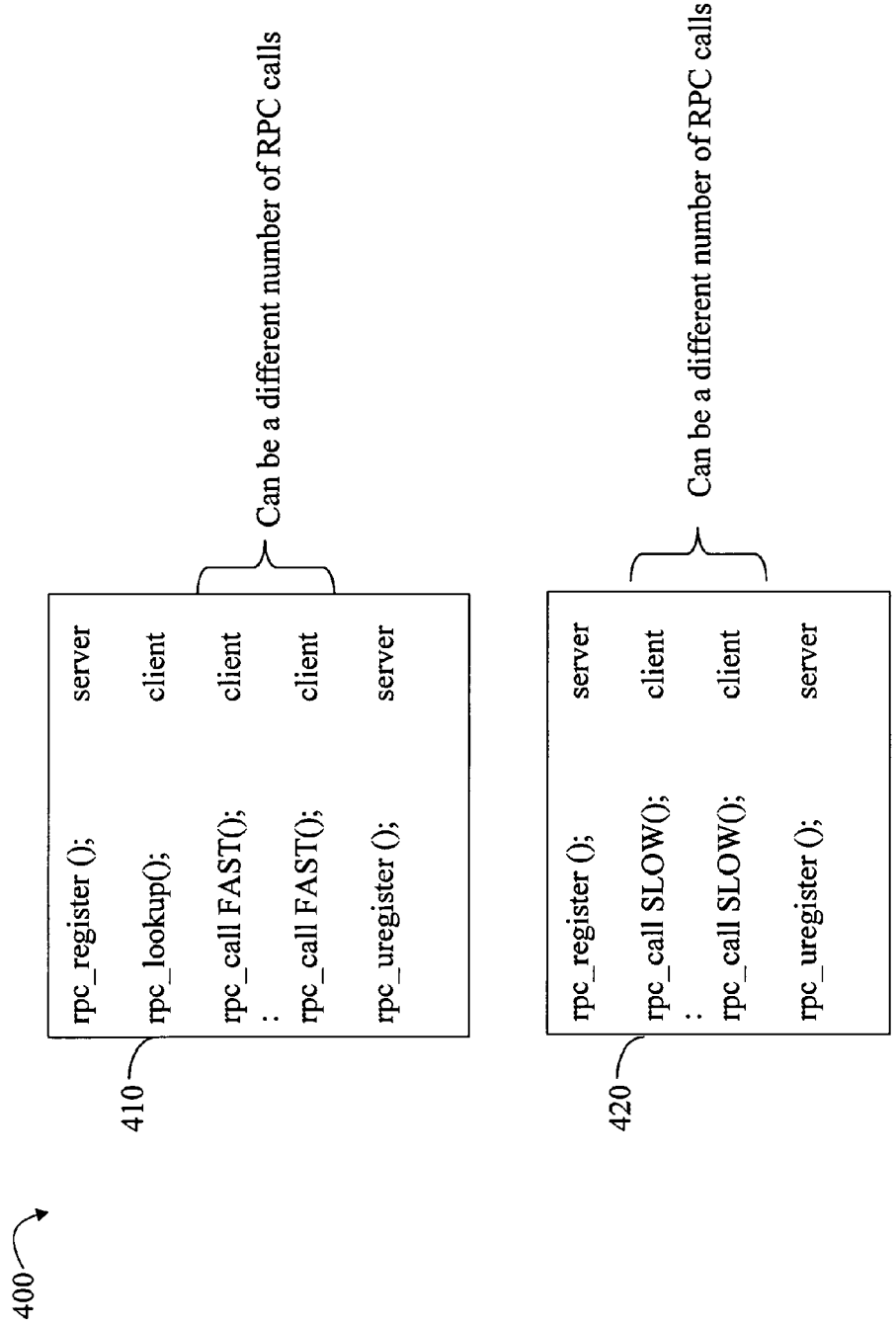
FIG. 5 is an example illustrating a call ordering of API calls in an embodiment in connection with techniques herein.

Referring to FIG. 5, shown is an example illustrating a possible ordering of API calls within an embodiment in connection with a same registered RPC. Element 410 illustrates a first possible ordering of API calls in connection with a registered RPC where the client utilizes the optimized technique involving the rpc_lookup and rpc_call FAST server APIs. It should be noted that a single rpc_lookup is performed and that one or more rpc_call FAST API invocations for the same registered RPC may be performed using the information regarding the registered RPC returned via the rpc_lookup. Element 420 illustrates a second possible ordering of API calls in connection with a registered RPC where the client utilizes the unoptimized technique involving the rpc_call SLOW server API.

In an embodiment in which the RPC facility is built on top of, and utilizes, the lower level intermodule communication mechanism and technique to facilitate inter-module communication between two code modules in different containers as described in the '759 and '822 patent applications, communications from the client container to the server container may form a command path including a request path from the client to the server to issue a request and a return path from the server back to the client. The command path may be characterized as a runtime path or call chain between the client and server. The call chain may include multiple invocation layers of routines including user code and one or more API routines of the intermodule communication techniques and RPC facility as described herein. It should be noted that one or more layers may be included in the command path and associated call chain above the RPC facility layer (e.g., where another user code module makes calls to API code using the RPC client-side API of FIG. 4).

Figure 5A:
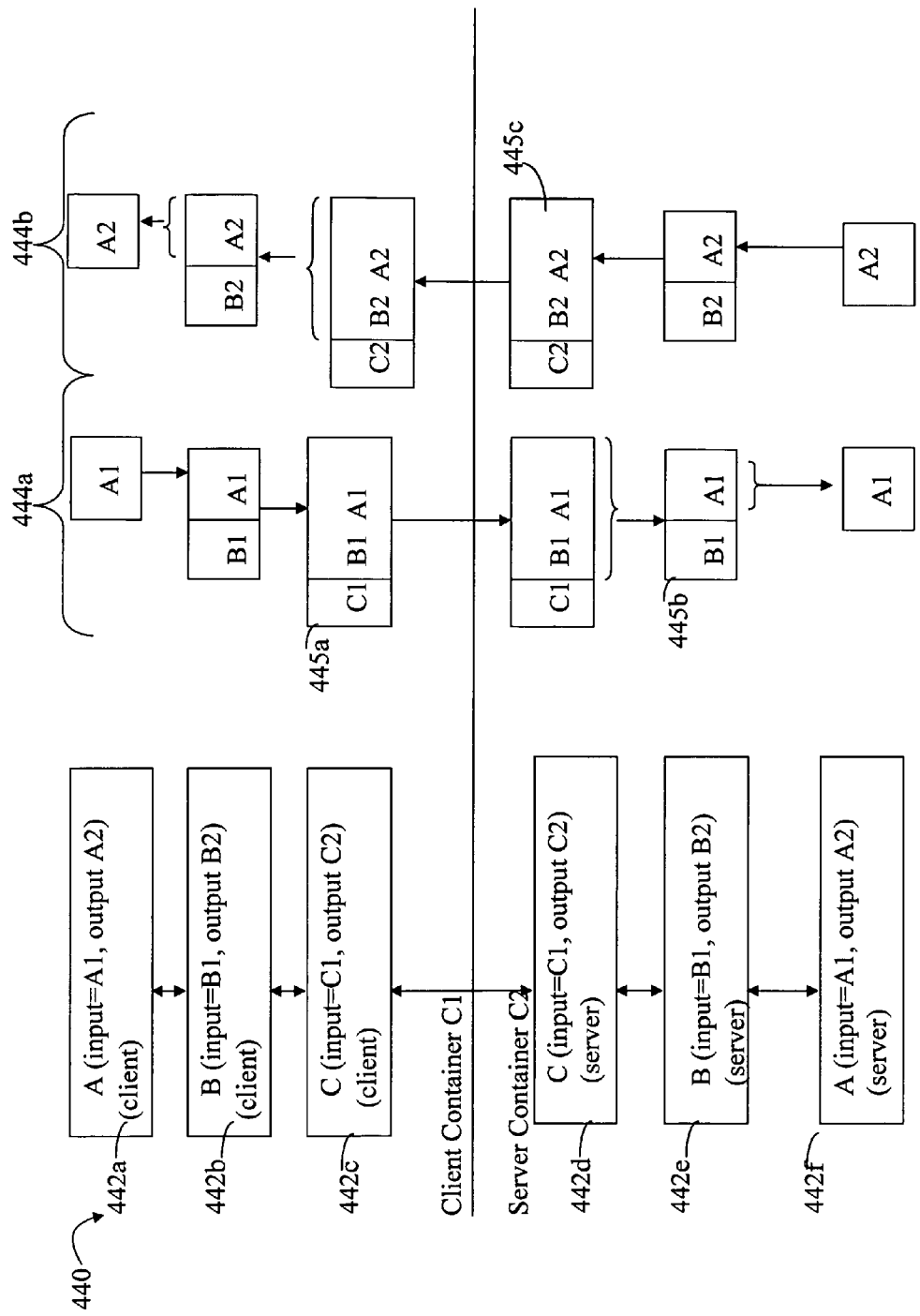
FIG. 5A is an example illustrating different layers in a call chain and command path in an embodiment in connection with techniques herein.

Referring to FIG. 5A, shown is an example illustrating multiple invocation layers as may be included in a command path in accordance with techniques herein. The example 440 illustrates container C1 which may be characterized as the client and container C2 which may be the server. At runtime, client C1 may have a runtime call chain of routines A, B and C where a call is made from routine A to routine B. Subsequently routine B makes a call to routine C. The call from routine A as illustrated by 442a may be a request to the server container C2 to invoke a registered RPC of the container C2. As a result of the invocation instance 422a, additional calls represented by 442b and 442c are also performed on the client side in connection with implementing this request directed to container C2 to perform the RPC. The additional calls may be included in the runtime call chain as part of processing to communicate with the server and request execution of a registered RPC. Furthermore, in connection with this initial invocation of 442a, routines may be invoked on the server side as indicated by 442d, 442e and 442f. It should be noted that the client and server may have parallel or symmetric calls included in the chain with the initial client call made at the highest client level corresponding to 442a. With reference to the example 440, levels on the client and server side, from highest to lowest, may be denoted by 442a-442f. Thus, A 442a may denote the lowest level on the client side and A 442f may denote the lowest level on the server side.

As a further example, routine A may be a user routine which performs a call using the rp_call FAST of the client side RPC API described in connection with FIG. 4. The rpc_call FAST API call results in executing code of the API which further includes additional API calls as specified in the intercontainer communications APIs as described in the '759 and '822 patent applications. For example, as will be described in more detail in following paragraphs, requests from the client to the server may be issued in connection with the rpc_call SLOW, rpc_lookup and rpc_call FAST client APIs using the appropriate intermodule communication techniques (that may vary with whether the client and server containers execute in user or kernel mode). Independent of whether the client and server are in user mode or kernel mode, the same API may be used for inter-container communication. As described in the '759 and '822 applications, an execute API call may be performed to issue requests from the client container to the server container for implementation of each of the client-side APIs of FIG. 4. Thus, the execute API may be an API call at a runtime level in the call chain lower than the RPC API call, for example, if the API code for rpc_call FAST further includes an execute API call. The user code invoking the rpc_call FAST API code may be at a level above the RPC API code. Thus, an exemplary call chain from highest to lowest may be user code-RPC API code-execute API code. A reciprocal or parallel set of calls in the chain (such as denoted by 442d, 442e and 442f) may exist on the server side in connection with performing the requested registered RPC identified in the rpc_call FAST invocation. For example, a client side execute API call may result in issuing a command request to the server container C2 causing execution of an exec-handler callback routine. Subsequently, this exec-handler on the server side may invoke the requested registered RPC of the server.

Element 444a may represent the input parameters passed down the call chain from client to server in connection with performing an RPC. The information communicated from the client container to the server container at the lowest client side level represents an aggregation of collected input data to that point in the call chain. It is this collected aggregation of data 445a from all the above levels in the client-side call chain which is passed to the server container for processing. A layer in the call chain may only have knowledge of its input and output parameters. A routine which is invoked in the call chain on the client side may add its input parameters to the set of other input parameters from layers higher up in the call chain. In one embodiment, an invoked routine may allocate storage for its input parameters and also for input parameter information passed to it from any layers above. The invoked routine may copy its input parameter information and other input parameter information from the above layers into the allocated storage, and then pass this to any lower level in the call chain. The foregoing may be performed at each layer in the call chain by an invoked routine until the bottom layer on the client side (e.g. 442c) is reached which communicates the input parameters to the server. In this example, each layer in the server side may remove and use a portion of the input parameters as produced by its corresponding client-side layer. For example, client side routine B passes input parameter B1 to the server for use by the corresponding server side routine B. On the server side, the server-side routine B receives input parameter data as represented by 445b, removes and uses B1, and passes the remaining set of input parameter data (including only A1 in this case) further down the call chain for use by other corresponding layers.

Element 444b may represent the output parameters which are populated by the server without output data and passed up the call chain from server to the client after performing an RPC. The output parameters may be passed along the return path up the call chain as denoted from 442f, 442e, 442d, 442c, 442b to 442a. In a manner similar to that as described above for constructing and passing input parameter data, output parameter data may be aggregated for the various levels in the call chain along the return path so that 445c may represent the collected aggregated output data from the server return path of the call chain which is communicated to the client. On the client side, each layer of the call chain in the return path may remove its output data as produced by the corresponding server side, and pass the remaining output data up the call chain until the point of origination (highest level in the call chain) is reached.

A technique that may be used in an embodiment in connection with passing input and output parameters among the various layers, for example, for use with performing remote procedure calls is described elsewhere herein. In such a technique, each layer in the hierarchy may perform processing for its input data and descriptors and also for its output data and output descriptors describing output or return data values.

Figure 6:
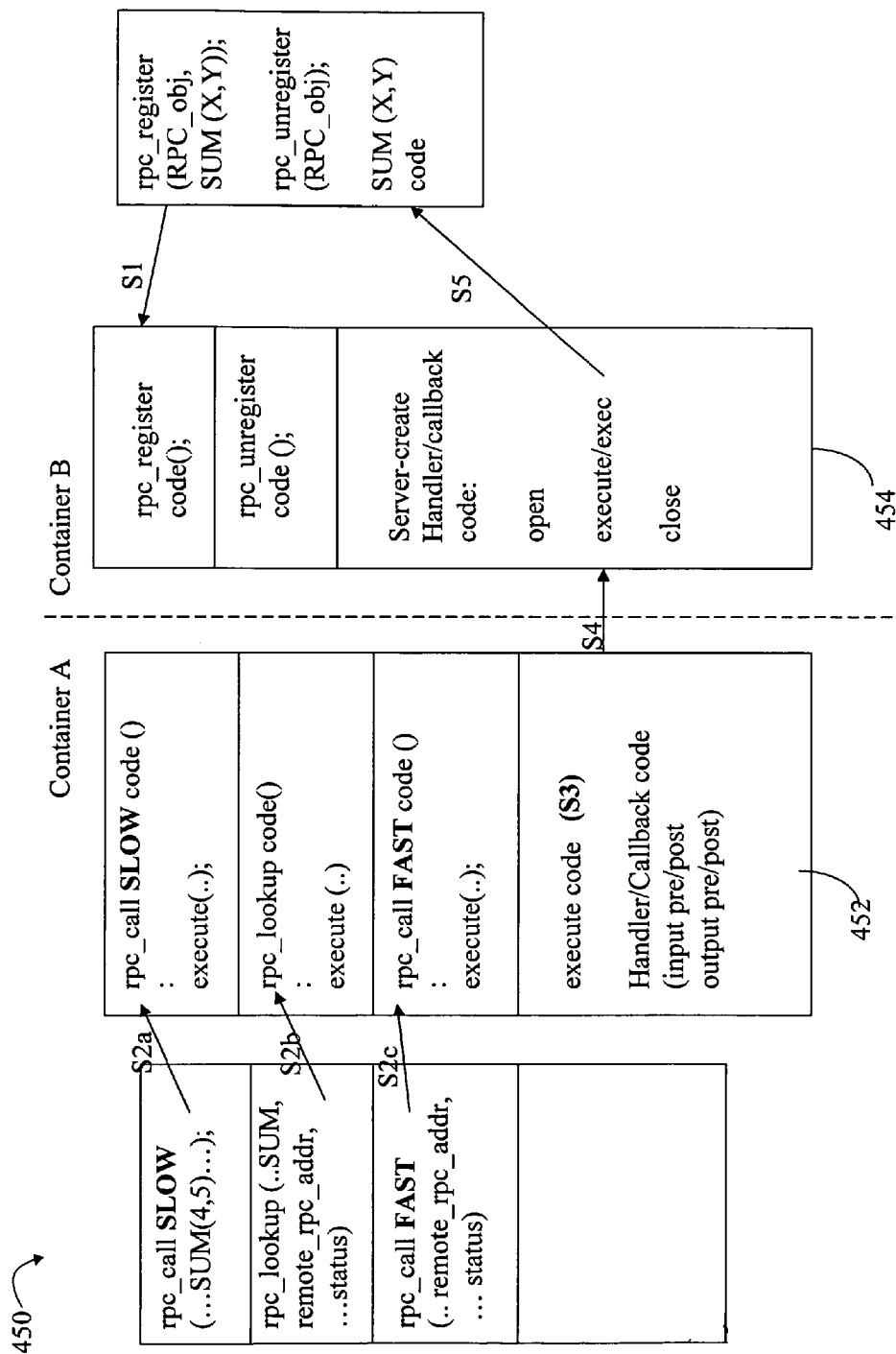
FIG. 6 is an example illustrating transfer of control in connection with illustrating use of the techniques herein in an embodiment.

Referring to FIG. 6, shown is an example illustrating interactions between different code modules and containers in connection with the techniques described herein for performing RPCs. The example 450 includes container A which may be a client container and container B which may be a server container. Although not illustrated in FIG. 6, it should be noted that a single container may function as both a client and a server in connection with techniques herein. Elements 452 and 454 may represent code modules invoked as a result of performing an API call using the APIs of FIGS. 3 and 4. Elements 452 and 454 may also include additional API code that may be invoked in connection with performing intermodule communications between containers.

The example 450 illustrates different execution flows and corresponding portions of code that may be invoked in connection with performing techniques herein. As a first step S1, container B may issue an rpc_register API call resulting in transfer of control to the rpc_register API code. The API code for rpc_register performs processing to register the RPC SUM. Additional details regarding processing performed by the APIs of FIGS. 3 and 4 are described below. Once the RPC SUM is registered, a client may subsequently issue requests in the form of RPCs to have the server container B execute the routine or code associated with the registered RPC SUM. In one embodiment in which the rpc_call SLOW technique is used, container A may issue a corresponding API call as illustrated by step S2a resulting in transfer of control to the rpc_call SLOW API code which then invokes the execute API code as illustrated by S3. In connection with intermodule communication techniques that may be used to implement the client-side API of FIG. 4, the execute client-side API and associated callbacks or handlers (e.g., input prepare, input post, output prepare, output post, and the like), and the server-create server side API and associated callbacks or handlers (e.g., open handler, exec or execute handler, and the like), are described in the 759 and '822 patent applications. The rpc_call SLOW API call to perform the SUM registered RPC may result in a request being sent from container A to container B as illustrated by S4. The transfer illustrated by S4 may be implemented using the appropriate intermodule communication technique as may be used by an embodiment of the execute API code (S3). As illustrated by S4, the request being issued by the client container A results in a transfer of control to the exec-handler API code of the server container B. The exec-handler API code of container B then transfers control to the code associated with the requested registered RPC SUM as illustrated by S5. When the RPC SUM has completed processing, control returns along the same path as just described until the point of origination or invocation of S2a.

What will now be described are other command paths that may be followed in an embodiment in which the rpc_call FAST technique is used rather than the technique associated with the rpc_call SLOW API call. Subsequent to registering SUM on the server side as illustrated by S1, container A may issue a corresponding API call as illustrated by step S2b to perform an rpc_lookup and obtain information identifying the RPC object in the server. Executing the rpc_lookup API call as illustrated by S2b results in a transfer of control to the rpc_lookup API code which then invokes the execute API code as illustrated by S3. The rpc_lookup API call to retrieve the information (e.g., pointer to RPC object used by the server) identifying the registered RPC may result in a request being sent from container A to container B as illustrated by S4. The transfer illustrated by S4 may be implemented using the appropriate intermodule communication technique as may be used by an embodiment of the execute API code (S3). As illustrated by S4, the request issued by the client container A results in a transfer of control to the exec-handler API code of the server container B. The exec-handler API code may perform processing to obtain the requested information regarding the registered RPC SUM, and then control returns along the same path as just described until the point of origination or invocation. Container A may then perform an rpc_call FAST API call as illustrated by step S2c resulting in transfer of control to the rpc_call FAST API code which then invokes the execute API code as illustrated by S3. The rpc_call FAST API call to perform the SUM registered RPC may result in a request being sent from container A to container B as illustrated by S4. The transfer illustrated by S4 may be implemented using the appropriate intermodule communication technique as may be used by an embodiment of the execute API code (S3). As illustrated by S4, the request being issued by the client container A results in a transfer of control to the exec-handler API code of the server container B. The exec-handler API code of container B then transfers control to the code associated with the requested registered RPC SUM as illustrated by S5. When the RPC SUM has completed processing, control returns along the same path as just described until the point of origination or invocation (point of invocation associated with S2c).

It should be noted that as illustrated in FIG. 5A, there may be one or more layers above on the client side than as illustrated which utilize the RPC API and techniques as described herein.

It should be noted that processing performed by code of the server side APIs of FIG. 3 may not require communicating with another container. In an embodiment in accordance with techniques herein, processing performed in connection with implementing the client side APIs of FIG. 4 may result in issuing an inter-container request, such as to the server container.

What will now be described are logical processing steps that may be performed by an embodiment in connection with the techniques herein for the different APIs illustrated in FIGS. 3 and 4.

Figure 7:
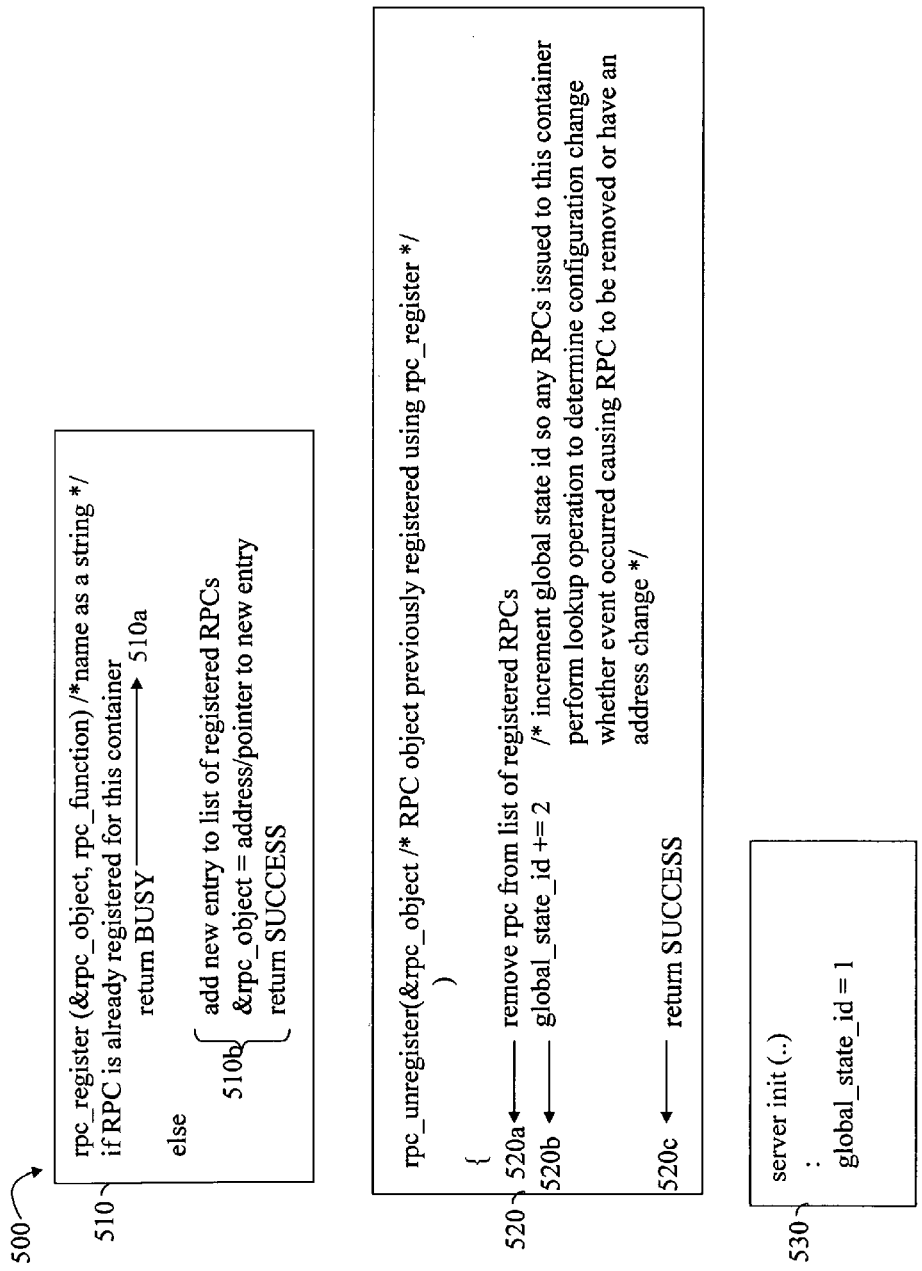

Referring to FIG. 7, shown is an example illustrating logical processing that may be performed by code on the server in connection with the RPC facility and techniques herein. Element 510 represents processing that may be performed by API code for the rpc_register routine to register an RPC. In one embodiment, the server may maintain a list of RPC objects corresponding to registered RPCs. As indicated in 510, when a request is made to register an RPC, the server checks to see whether the RPC is already registered. If so, at step 510a an appropriate status is returned. Otherwise as indicated by 510b, processing is performed to add a new RPC object as a new entry to the list of registered RPCs. The RPC object may be initialized to include information for the particular RPC. For example, the RPC object may include a record or field in which a string corresponding to the function name (as passed in by parameter rpc_function) is stored. The RPC object may include a record or field for storing the address of the routine or body of code for the RPC. Control is transferred to this address in order to perform the registered RPC as may be requested by a client. Once the RPC object has been created, initialized and placed on the list of registered RPC objects for the server, a status of success may be returned.

Element 520 represents processing that may be performed in connection with the rpc_unregister API. At step 520a, the RPC is removed from the list of registered RPCs by removing the RPC object representing the RPC being unregistered. At step 520*b*, the variable global_state_id is incremented by 2 to indicate or record an RPC configuration change. As described in connection with other processing, the global_state_id may be used to detect changes in RPC configuration which may affect the validity of the information cached by the client returned as a result of the rpc_lookup API call for use in performing subsequent RPC calls using the API described herein. At step 520*c*, success is returned.

It should be noted that although the global_state_id variable is incremented by 2 to indicate an RPC configuration change being tracked, an embodiment may also use other techniques to indicate and track desired changes. For example, an embodiment may increment the variable by an amount other than 2. Generally, an embodiment may use a technique where each unregister event results in a different or unique value reflecting this RPC configuration state change.

In connection with techniques described herein, a server container may be characterized as having a remote procedure call configuration that may vary at different points in time, for example, depending on what RPCs are registered. The server container may maintain remote procedure call configuration information describing its current remote procedure call configuration state. The global state identifier may be included in remote procedure call configuration information for a container which characterizes its current remote procedure call configuration state. More generally, remote procedure call configuration information may also include other information related to the remote procedure call configuration of a server container such as what RPCs are registered and information about a registered RPC such as, for example, a pointer to an RPC object, an address of a routine corresponding to code or a routine for a registered RPC, and the like. The RPC object described herein may be more generally referred to as a remote procedure call descriptor describing an instance of an RPC object for a registered RPC.

Element 530 indicates processing performed as part of the server init API code. The server init API is described in 'the 759 and '822 applications. Part of the processing performed by the API code as indicated by element 530 is initializing the variable global_state_id to 1.

Figure 8:
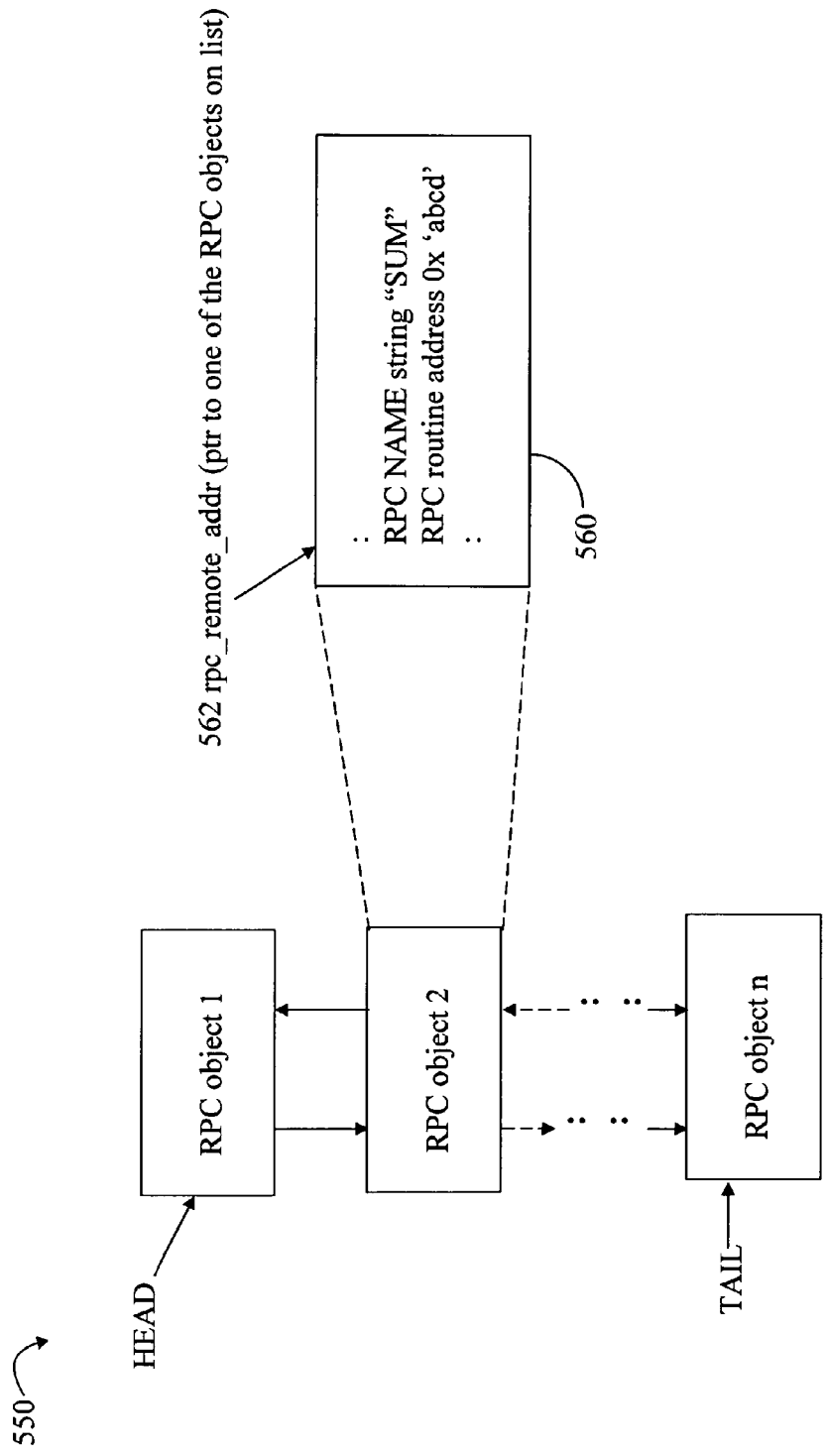
FIG. 8 is an example illustrating a list of registered RPC objects that may be maintained for each server in an embodiment in accordance with techniques herein.

Referring to FIG. 8, shown is an example illustrating a list of registered RPC objects that may be maintained for each server container. The example 550 includes a list of RPC objects where there is an entry on the list for each RPC registered at a point in time for the server container. The list may be manipulated using pointers or other appropriate management techniques that may vary with how the list is implemented. In this example, the list may be implemented as doubly linked list although other data structures may also be used. Element 560 illustrates in more detail records or fields that may be included in each RPC object. In this example, element 560 may include a string identifying the name of the RPC, such as "SUM". The element 560 may also identify the address of the routine which is invoked when a request is made to perform the RPC. An embodiment may include other information than as illustrated in FIG. 8.

At a point in time, the list illustrated in the example 550 for a server container may be traversed to determine the currently registered RPCs for the server and also obtain information regarding the currently registered RPCs.

Figure 9:
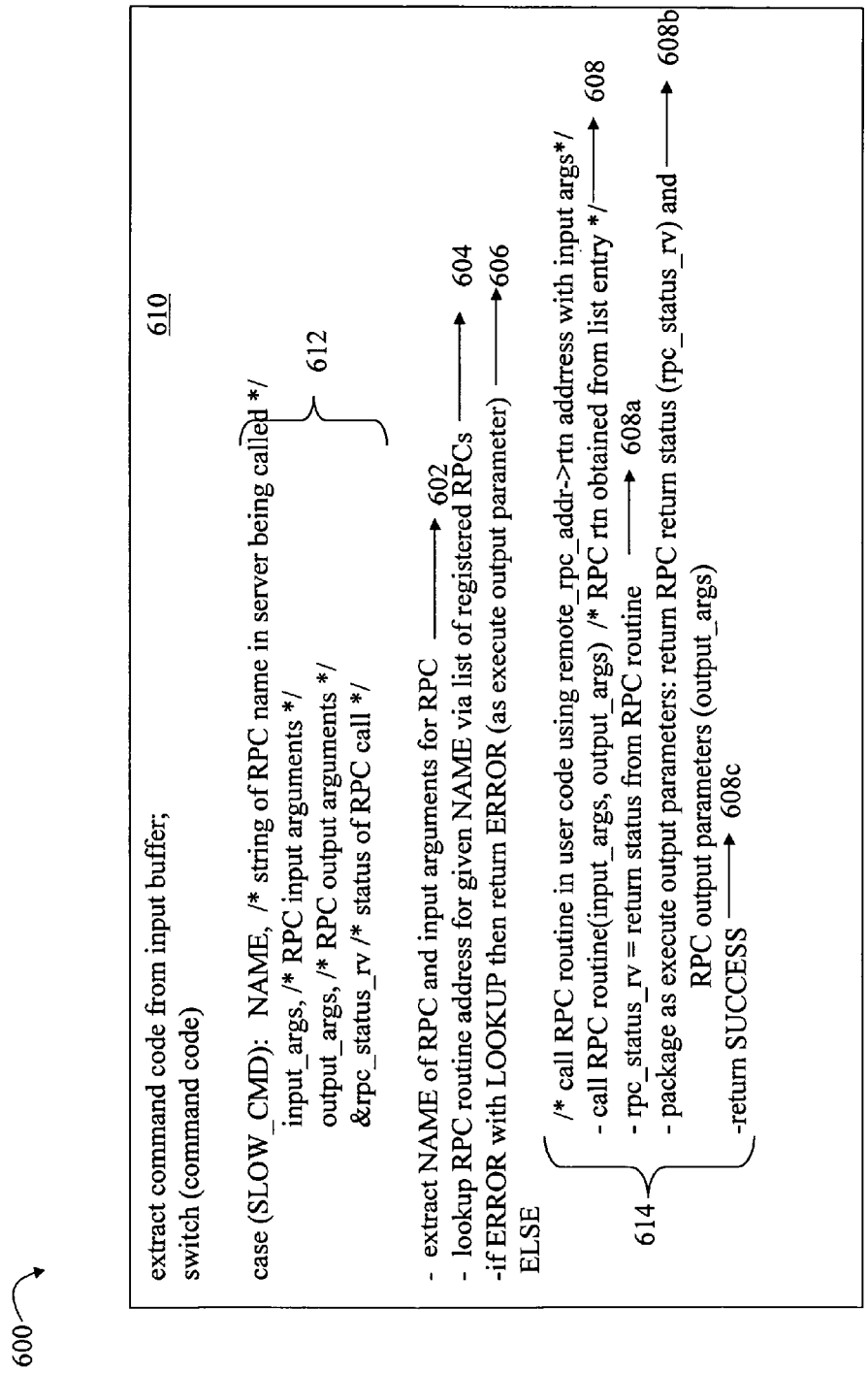
Figure 10:
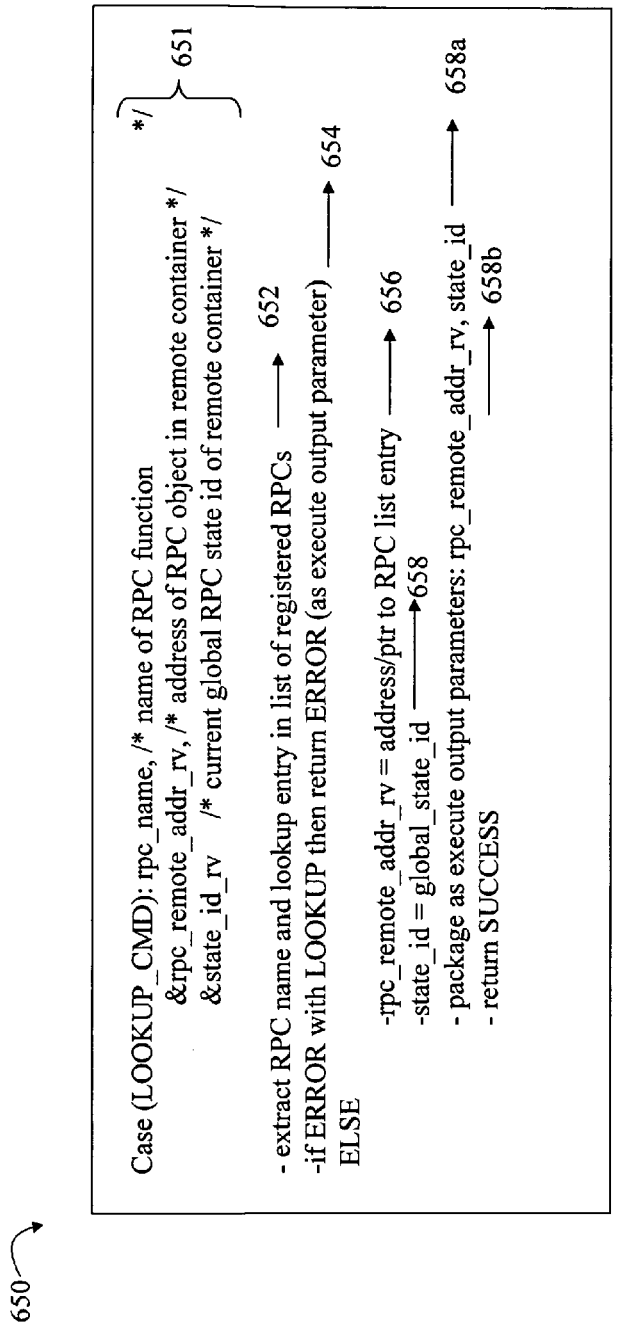
Figure 11:
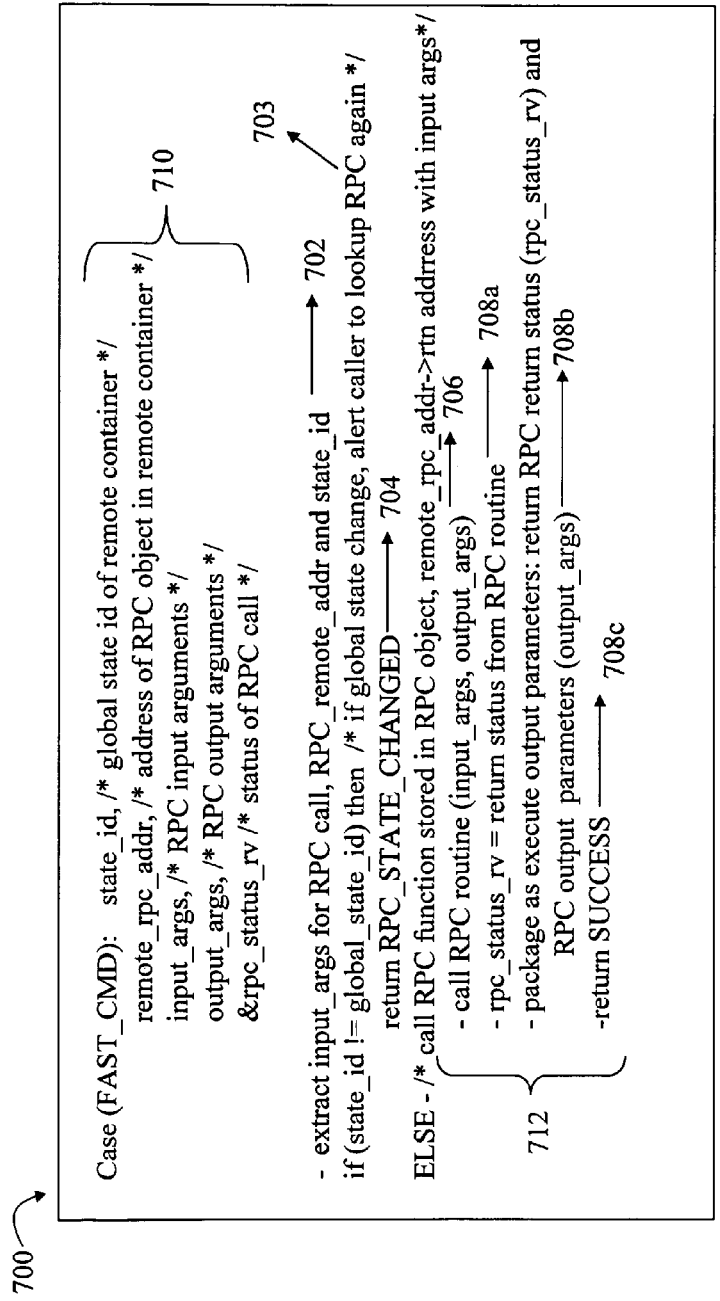

Referring to FIGS. 9, 10 and 11, shown are examples describing processing that may be performed by code on the server side in connection with processing a received client request for one of the client-side API calls of FIG. 4. As previously described, for example, in connection with FIG. 6, the exec-handler on the server-side is invoked in connection with the command path in an embodiment using the intermodule communication techniques of the'759 and '822 applications. FIGS. 9-11 describe the processing performed by the exec-handler on the server side in response to receiving command requests for the different client side API calls of FIG. 4. As described elsewhere herein, each of the client-side API calls of FIG. 4 may result in a request being issued to the server via the execute client-side API.

The example 600 of FIG. 9 includes a case statement which switches on a command code where a different command code may be transmitted from the execute code of the client to the exec-handler of the server for each of the different client-side API calls of FIG. 4. When the command code indicates an rpc_call SLOW is issued, processing of 610 is performed. The execute call from the client transmits the necessary input data and parameters including the input parameters passed to the rpc_call SLOW API code such as indicated by 612. At step 602, the NAME of the RPC to be invoked and the RPC input arguments are extracted from the input parameter block. At step 604, the RPC routine address may be looked up in the list of registered RPC objects for the server. Step 604 may include linearly traversing the list and comparing the RPC NAME field of each RPC object entry to the NAME input parameter until a match is found. An embodiment may implement the list using any one of a variety of different structures and techniques known in the art. For example, an embodiment may use a hash table where the RPC names are hashed to determine the associated list entry. At step 606, a determination is made as to whether the lookup successfully found a match based on the RPC name as a string. If not, an error is returned in step 606. If a corresponding entry for the requested RPC NAME is found on the registered RPC list for the server, processing of 614 is performed. At step 608, the RPC routine is invoked using the address obtained from the matching entry found on the registered RPC list. At step 608*a*, the rpc_status_rv is assigned the return status from the RPC routine. At step 608*b*, the rpc_status_rv and RPC output parameters (output arguments) are packaged as execute output parameters to be returned to the client. At step 608*c*, a success status is returned.

Referring to FIG. 10, shown is an example of processing that may be performed by the exec-handler or callback on the server when the command code indicates an rpc_lookup is issued from the client. The data received by the server from the client may include the information of 651. At step 652, the rpc_name is extracted from the received data from the client and the list of registered RPCs for the server may be traversed to determine a corresponding entry and RPC object, if any, as described above. If no such entry is found on the list as illustrated by 654, an error status may be returned. Otherwise, if a corresponding entry and RPC object is located on the list of registered RPCs, the output parameter rpc_remote_addr_rv is assigned the address of the located RPC object in the list. At step 658, the output parameter state_id is assigned the current value of the global_state_id for this server. At step 658*a*, rpc_remote_addr_rv and state_id are packaged as output parameters returned to execute on the client side. At step 658*b*, a success status is returned.

Referring to FIG. 11, shown is an example of processing that may be performed by the exec-handler or callback on the server when the command code indicates an rpc_call FAST is issued from the client. The data received by the server from the client may include the information of 710. At step 702, the remote_rpc_addr, input args for the RPC, and state_id are extracted from the received data from the client. At step 703, a determination is made as to whether the state_id is the same as the current value for the global_state_id. If not, there has been a change to the RPC configuration for this server and a corresponding status is returned to the caller in step 704. This status returned in step 704 may alert the caller who may then respond by obtaining a fresh value for remote_rpc_addr (such as by performing an rpc_lookup API call). As described herein, remote_rpc_addr may identify the RPC object in the server's address space. As illustrated in FIG. 8, one of the fields in this RPC object may be the address of where to transfer control in response to receiving a corresponding client request to perform the RPC.

Different events may cause the unregister API call to be executed for an RPC such as, for example, when a code module within a server is unloaded or removed from the server's address space. For example, a server container may be executing at a first point in time and an RPC may be registered. Prior to unloading a code module from the server container's address space, the RPC may be unregistered causing an RPC configuration state change. At a second point in time, the code module of the server container may be reloaded and the RPC included therein may be re-registered. In such a case, if the client has a value for remote_rpc_addr obtained when the server is running at the first point in time and then tries to use this value after the second point in time, the address (as denoted by the value) may be stale and no longer identify a valid RPC object for the RPC. There is no guarantee that the server's address space contents from the first point in time is preserved across the unloading and reloading of the code module. As a result, such events causing an unregister may result in RPC configuration changes for the server so that a client's cached value for remote_rpc_addr is stale, dirty or otherwise rendered invalid for subsequent use. Returning RPC_STATE_CHANGED indicates detection of this condition. If no global state change is determined, processing of 712 is performed. At step 706, the RPC routine is invoked with the appropriate input and output arguments. At step 708a, the rpc_status_rv is assigned a return status from the RPC routine invocation. At step 708b, rpc_status_rv and the RPC output arguments (output_args) are packaged and returned to the execute code on the client side. At step 708c, a success status is returned.

What will now be described in more detail is processing that may be performed by code on the client side in connection with techniques described herein.

Referring to FIG. 12, show is an example illustrating processing that may be performed by code included in the client side for the rpc_lookup API. The parameters of the API call are as indicated by 760. At step 752, an execute API call is performed to issue a request from the client to the server to perform the lookup for the indicated RPC (rpc_name). After control is returned, a determination is made as to whether the status indicates that the requested server is not present. If so, step 754 returns a corresponding status. If the status indicates that the requested RPC is not found but the server is present, then a corresponding status is returned in step 756. Otherwise, step 758 returns success. It should be noted that an embodiment may perform processing for handling different types of possible errors than as described herein. Although not included as part of the example 750, an embodiment may have some portion of client code cache the returned values for rpc_remote_addr_rv and state_id_rv for use in connection with subsequent client side API calls for rpc_call FAST. Processing for caching the foregoing return values from this API call (returned from the server) may be performed by code of the rpc_lookup API or other code on the client side.

Figure 13:
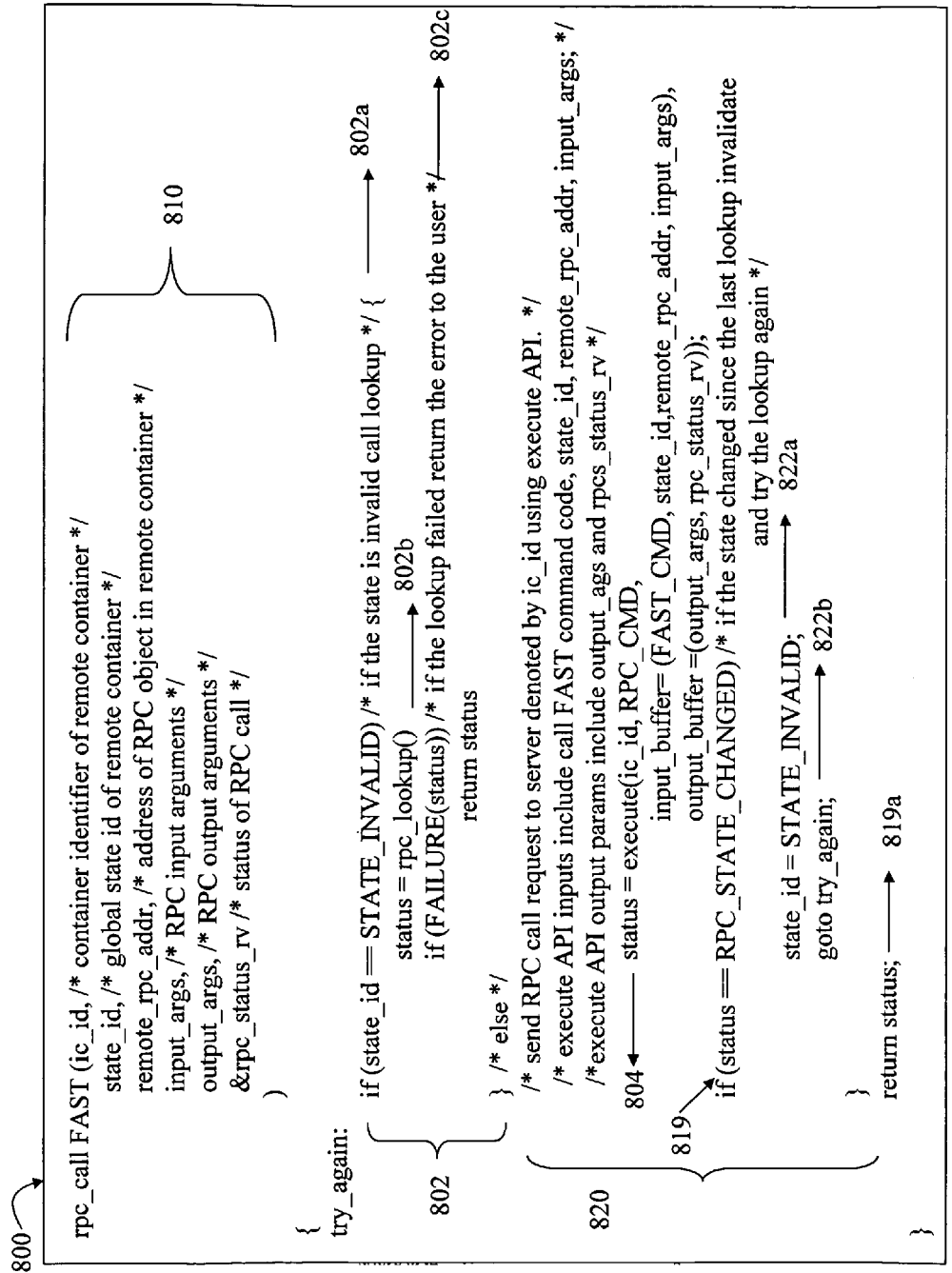

Referring to FIG. 13, show is an example illustrating processing that may be performed by code included in the client side for the rpc_call FAST API. The parameters of the API call are as indicated by 810. At step 802a, a determination is made as to whether state_id indicates an invalid state for the call lookup. If so, the rpc_lookup API is invoked in step 802b to try and obtain a valid value for remote_rpc_addr. If the call at step 802b results in failure, a corresponding status is returned in step 802c. If the call at step 802b does not result in failure status being returned, processing of 820 is performed. In step 804, the RPC call request is sent to the server using the execute API call. At step 804, a return status for the execute API call is examined. If the status indicates that the server's RPC configuration has changed as indicated by a return value of RPC_STATE_CHANGED in step 819, state_id is updated as in step 822a and control proceeds to try_again at step 822b to attempt to obtain a value for remote_rpc_addr. Status is returned in step 819a.

Referring to FIG. 14 show is an example illustrating processing that may be performed by code included in the client side for the rpc_call SLOW API. The parameters of the API call are as indicated by 860. At step 852, the RPC call request is sent to the server using the execute API call. Step 852 assigns status as returned for the execute API call. At step 854, the status is returned.

What will now be described is a way in which the input and output parameters may be communicated between the various layers in a call chain on the client side and server side and how the data may be processed prior to transmitting from the client to the server. Also described is how an embodiment may process data returned from the server to the client. The data received by the client may be returned in response to a previous request issued from the client, for example, such as in connection with a request issued via the execute API call for one of the client-side APIs of FIG. 4.

With reference back to FIG. 5A, processing was described for the input parameters, for example, where each layer in the call chain on the client side may allocate storage for that layer's input parameters and storage for any input parameters and other data communicated from layers above. The current layer in the call chain may then copy its own information and information from layers above into the allocated storage, and then pass this information onward to subsequent layers down in the call chain. More generally, a called routine may receive data from the caller that needs to be sent to another container such as for the RPC API described herein. The called routine may build a structure for the command containing the called routine's information and also including the caller's input data and metadata (such as input descriptors) as well as other metadata, for example, that may be needed in connection with output parameters. The called routine sends the structure for the command to the lower levels of the call chain or command path and the lower levels in the call chain may also perform similar processing. As described above, one way to implement such a command path is to have each level in the call chain allocate the space necessary for its own data and metadata as well as the information provided by the layer above, and copy all of the foregoing into the allocated buffer. The foregoing may be characterized as inefficient in that additional overhead in terms of processing and resources are used in connection with storage allocation and copying performed at each layer. As additional layers in a multi-layered implementation increase, so does the inefficiency.

What will now be described is an alternate technique that may be used in connection with processing input and output parameters at the various layers in the call chain such as in connection with the RPC facility described herein where data from multiple layers in the call chain is transmitted to the server. Described in following paragraphs are techniques that may be used to provide a common format for describing data used in connection with multiple layers in the call chain where each level can construct a chain describing its own metadata and data and embed the information for the levels above. The resulting information can then be encoded for transport and sent to another container. An implementation may also contain performance optimizations and ensure that only the relevant information is copied when sending the command and receiving the response.

Figure 15:
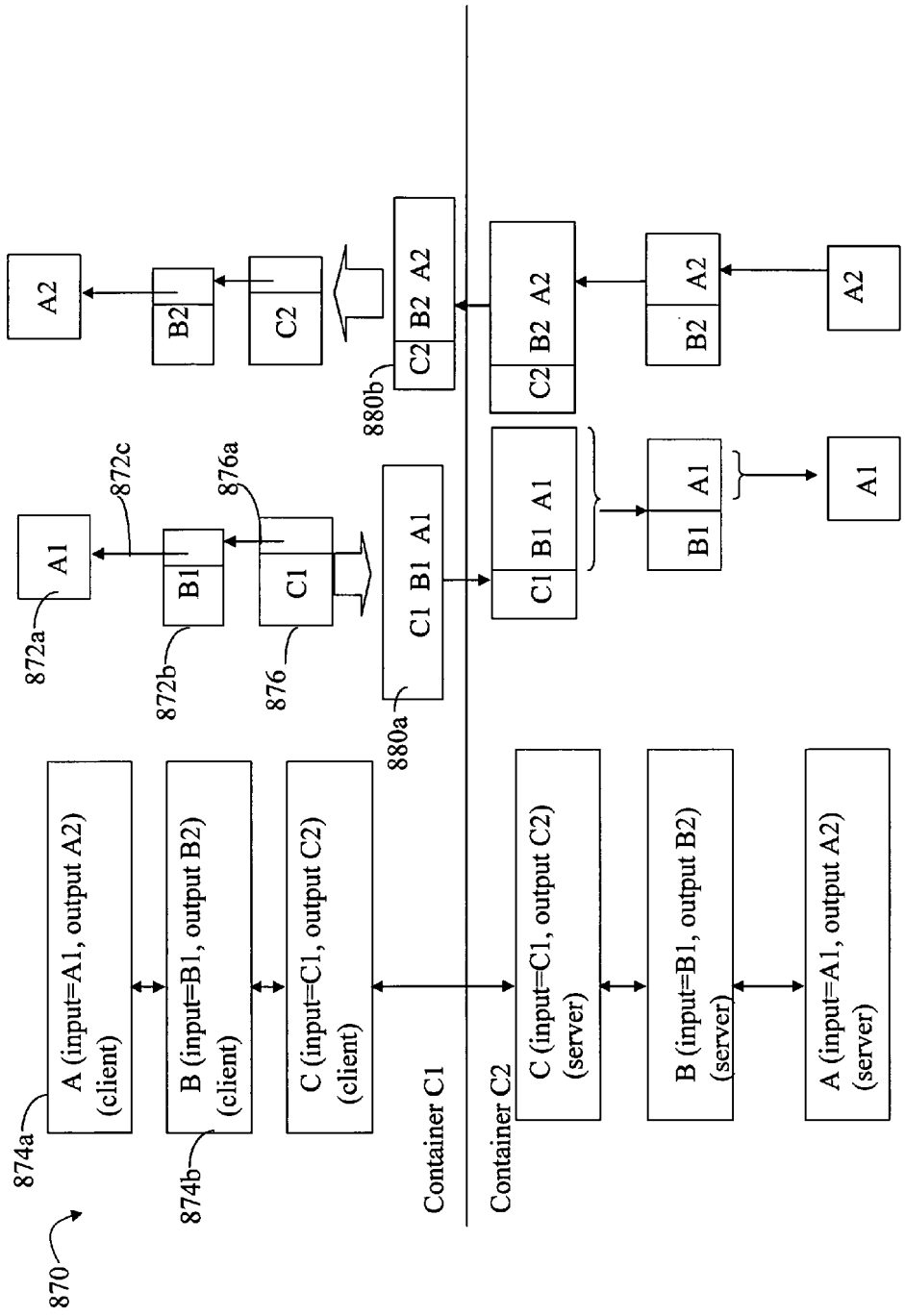
FIGS. 15, 15A, and 16 are examples illustrating use of data and descriptors with embedded lists in an embodiment in accordance with techniques herein.

Referring to FIG. 15, shown is an example illustrating a technique that may be used in connection with processing input and output parameters at the various levels in the call chain. At each layer in the call chain, processing is performed to allocate storage and copy into this allocated storage the input parameters for the current layer. Additionally, parameters from the upper layers are embedded or linked into a list of parameters using pointers. Thus, each layer in the call chain may have an associated embedded list for its input parameters, and an associated embedded list for its output parameters. For example, routine A 874a may call routine B 874b. As indicated by 872b, routine B allocates storage for its parameter B1 and embeds the parameters from layers higher in the call chain using a pointer 872c to the collective or aggregate set of input parameters associated with higher layers in the call chain. Thus, input parameters used by routines occurring previously in the call chain may be represented as an embedded list using pointers. Similarly, routine C references all input parameters of layers higher in the call chain via pointer 876a so that element 876 provides access to all input parameters for the current layer in the call chain and layers higher in the call chain. As a result, the input parameters may be represented using a hierarchical structure of embedded lists connected via pointers. The hierarchical structure of input parameters may be constructed as the calls progress down the call chain until the client is ready to communicate with the server container. As will be described in following paragraphs, at this point, code on the client side may marshal parameters into a flat or linear arrangement forming a data stream which is transmitted to the server. As also described herein, the marshalling process may be characterized as encoding the parameters in a different format for transmission to, and use by, the server. The server may operate on the parameters in this encoded format and also store output parameters and other information in this encoded format. The client may receive any return or output parameters in this encoded format and then unmarshal or decode the data into its original hierarchical structure and format for use in processing by the client side. For example, 880a may represent the encoded format generated prior to transmission from the client to the server. Data of 880a may then be sent to the server for processing. Each layer on the server side may remove input parameters it uses and pass remaining data to subsequent layers down the call chain by adjusting an offset into the flat or continuous segment of input parameters in the encoded form. Similarly, the output parameters may be constructed on the server side to build a flat or continuous segment of the output data which is then transmitted back to the client as represented by 880b. Upon return to the client, the client may then unmarshal or decode the data of 880b into a hierarchical structure of embedded lists linked together using pointers where each layer has its output parameters on a separate embedded list. It should be noted that an embodiment may also have each layer on the client side of the call chain build an output data area populated with output descriptors and metadata. The metadata included in the output data area may then be used by the server in connection with storing output data to particular locations.

As mentioned above, marshalling may refer to the process of transforming a representation of an object into a data format suitable for transmission such as from one container to another in connection with remote procedure calls and associated requests as described herein. Marshalling may be used in different embodiments in accordance with techniques described herein to serialize an object by converting its data into a byte stream in such a way that the byte stream may also be converted back into a copy of the original data object. The process of converting encoded data (the byte stream resulting from marshalling) back into the original data object or decoded format may also be referred to as unmarshalling.

Figure 15A:
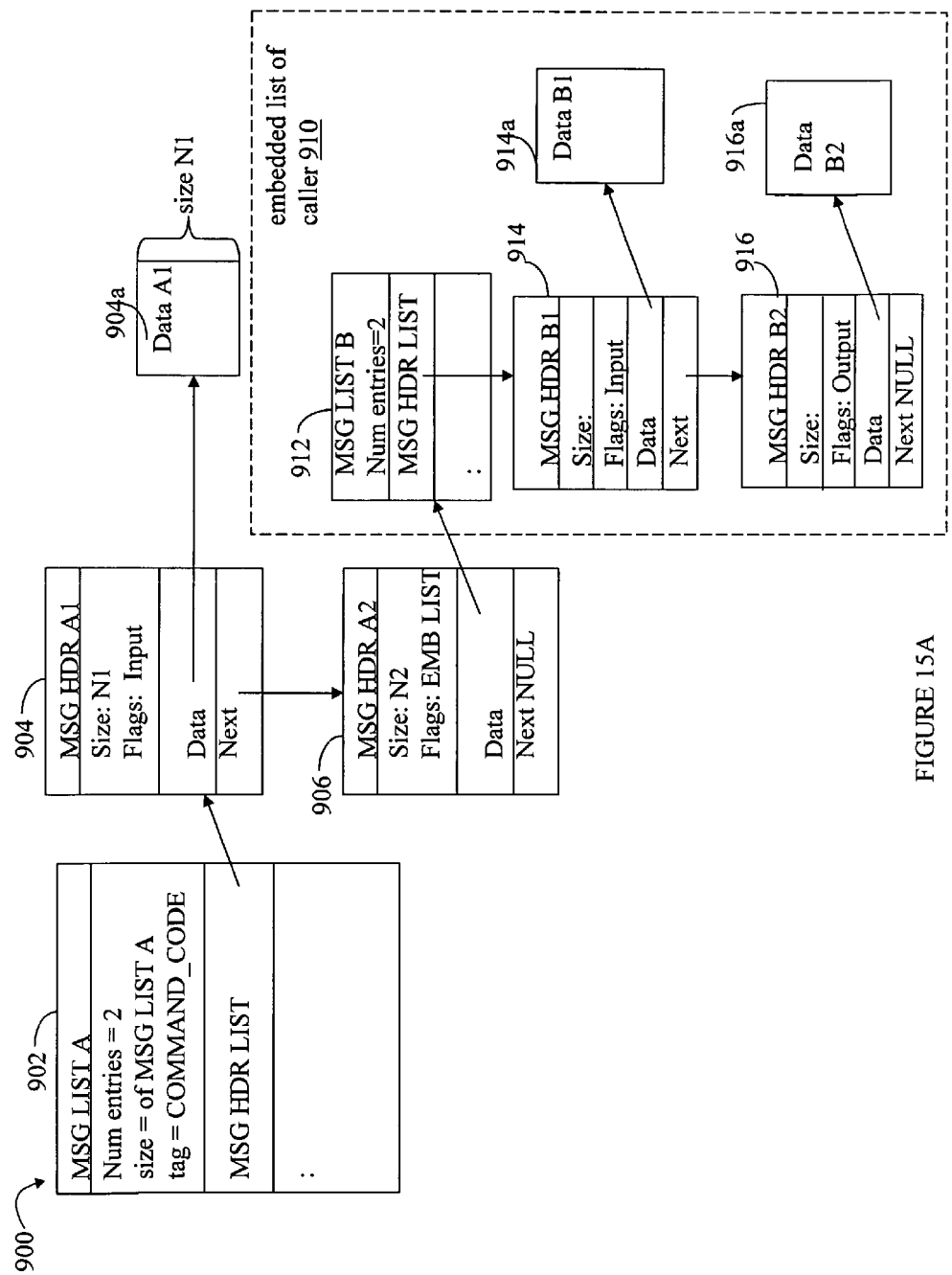

Referring to FIG. 15A, shown is an example 900 of how a hierarchical structure may be created and used in connection with the techniques herein. In the example 900, it should be noted that input and output parameters are illustrated as being intermixed in the same structure. However, an embodiment may also construct and use on the client side a first hierarchical structure for input parameters and a second different hierarchical structure for output parameters as illustrated in FIG. 15. As will also be described in more detail below, an embodiment may use an encoded format where the input and output information are intermixed. Alternatively, an embodiment may use an encoded format where each of the input and output information is maintained in a separate buffer or data area.

The example 900 may represent input and output parameters where a first call is made to routine B, and then a second call is made from the routine B to a routine A. In connection with the first call, routine B may be invoked using the following parameters:

Call $B$(input parameters=$B1$,output parameters=$B2$).

In connection with the second call, the code of routine B may then perform a call to routine A using the following parameters:

Call $A$(input parameters=$A1$,embedded message list from routine $B$)

and without any output parameters consumed by routine B. The above "embedded message list from routine B" refers to the list of 910 of FIG. 15A illustrating where the called routine A is passed parameter information of 910 from the calling routine B.

Parameters for a current level or layer in the call chain may be represented using a message list where each entry in the message list corresponds to either a parameter of the current layer or another message list that is an embedded list of parameters from a next highest level in the call chain. For example, the list of input and output parameters for routine B may be represented by element 910 which includes a message list denoted by 912. The message list 912 includes a first entry 914 corresponding to the input parameter B1 and an entry 916 corresponding to the output parameter B2. The data for parameter B1 may be stored in a data area 914a referenced using a data pointer of 914 as illustrated. Similarly, the data for parameter B2 may be stored in a data area 916a referenced using a data pointer of 916. When routine B calls routine A, routine A may allocate storage for its own message list represented by element 902 which includes a first entry for a first parameter A1 (having an entry on the message list 902 denoted by 904) and a second entry that is an embedded list. In this example, routine A allocates storage for 902, 904 and 906 and then links or chains to the embedded list 910 using the data pointer of element 906.

The example 900 illustrates message lists as may be used in an embodiment. The message list is denoted by a structure such as 902 and may include message list metadata (e.g., number of entries, size of the message list in bytes, a tag) and a pointer to a list of one or more entries (MSG HDR LIST). As described above, a message list contains headers (e.g., 904, 906, 914, 916) that describe data (such as input and output parameters) or other embedded message lists (e.g., 912). As also described above, message lists may form a hierarchical structure, such as a tree, of metadata that describes data buffers at each level of a command path or call chain. The message lists described herein may be used to prevent excessive data copying and command reconstruction that would otherwise occur at each level through the call chain or command path. Once a command is ready to be sent to another container, the message list can be marshalled into a single self-describing contiguous data buffer that contains necessary input data as well as the descriptors used by the receiver/server to determine where to copy the output data. During encoding, each header in the list may be transformed into a fixed-size format.

In one embodiment, the process of encoding a message list may involve traversing each element in the structure from a root element such as associated with a current level in the call chain. In one embodiment, recursion may not be utilized since the code may execute in kernel mode. As a result, an embodiment may perform processing which traverses the hierarchical structure representing the message lists in an iterative manner. An embodiment may build or construct a parallel linear list as new message lists are added. For example, an embodiment may record and construct a parallel list as the hierarchical structure is built where the parallel list may be a linear list including entries thereon having an ordering corresponding to a depth first traversal through the hierarchical structure. In one hierarchical structure, an additional list may be maintained extending from each entry in the top level or root message list. Each time an embedded list is added at a level in the hierarchy and the embedded list originates from an entry in the root message list, all of the message headers (entries) in the embedded list may be included in another list associated with the originating entry in the root message list. When it is time to encode the hierarchical structure, the linear list(s) may be traversed and the information of the linear list(s) encoded into a second format such as described in more detail in following paragraphs.

Using the encoded list, the receiver can access any output data required for the command, and set the actual amount of buffer space used for each message header. When the command is returned to the user, the encoded list in the command buffer may be decoded so that all the output data can be copied into the user's client side data buffers. Any relevant metadata, such as the actual buffer size used, may also be copied into the original message list metadata as part of the decoding stage. Once decoded, parts of a message list can be reused by the different levels of the command path.

In FIG. 15A, it should be noted that several fields of the different structures are illustrated. Additional detail regarding fields that may be included in structures of FIG. 15A is described in following paragraphs.

Figure 16:
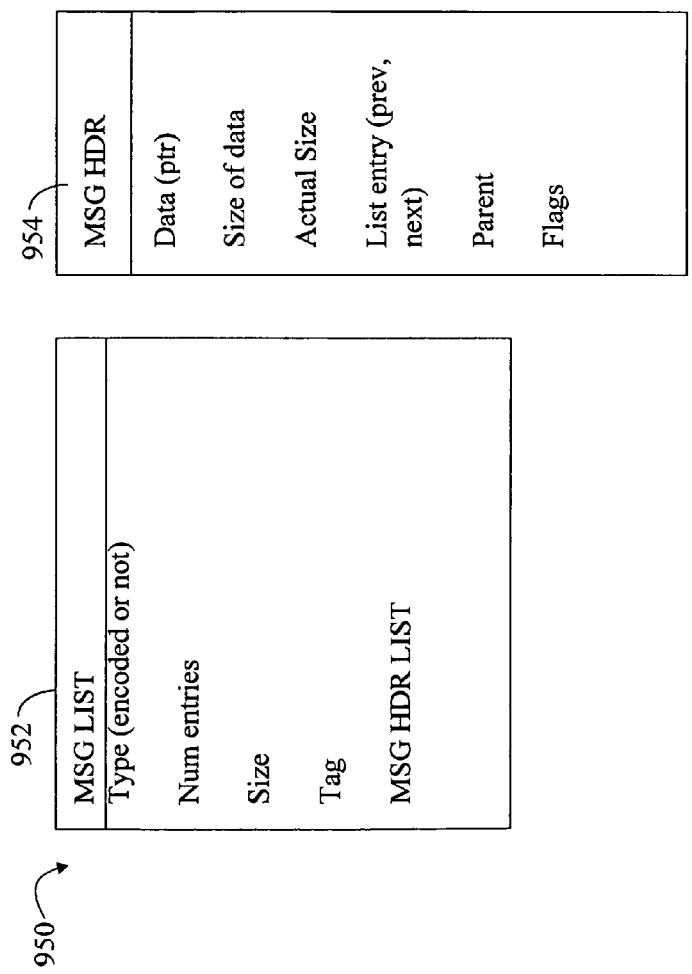

Referring to FIG. 16, shown is an example illustrating in more detail fields that may be included in message list (msg list 952) and message header (msg hdr 954) structures in an embodiment in accordance with techniques herein. The msglist 952 may include the following fields:

type—indicating whether the list has been encoded or not.
num entries—indicating the number of entries in a message list. An embedded list may count as a single entry in another message list.
size—specifies the size or amount of storage needed to encode a message list. The size may denote a cumulative amount of storage needed to store each message header, the data described by each message header, and also any storage needed for all embedded lists.
tag—user-specified tag that may be used to associate a command code with a message list containing the command data. For example, the tag may denote a command code corresponding to each of the different client-side API calls.
msg_hdr_list—this is a list of all children message headers.

A msg hdr (message header) 954 may be used to describe a fixed size data region that can contain user data or another embedded message list. In one embodiment, the following fields may be included in the msg hdr structure:

data (ptr)—pointer to a data region containing user data. When a message header describes an embedded message list "data" points to that list.
size—Size of the user data region as identified by the data pointer (data ptr field).
size_actual—This field is used to track the actual size of output data after a command request. If an entire output buffer is not used, an embodiment may only copy the bytes that contain output data back into the original buffer when decoding.
list_entry—includes a previous pointer and a next pointer identifying, respectively, the previous and next msg hdrs or entries on the parent message list.
parent—this is a pointer to the message list (msg list structure) that a message header is located on as an entry.
flags—may be used to indicate a usage of the data described. For example, a flag may indicate whether the data is input data or output data. If the data is indicated as input data, an embodiment may only copy the associated data when sending a command. If the data is indicated as output data, an embodiment may only copy the data at command completion such as upon return from the server. The flag may also indicate that the message header describes an embedded message list An embodiment may includes other information in a msg list structure 952 and/or msg hdr structure 954 than as described. For example, an embodiment may store additional pointers in connection with generating a linear list in addition to the hierarchical structure. For example, one embodiment may maintain an additional list of msg hdrs representing a depth first traversal. Each time an embedded list is processed, entries from the embedded list may be added to a additional list.

Figure 16A:
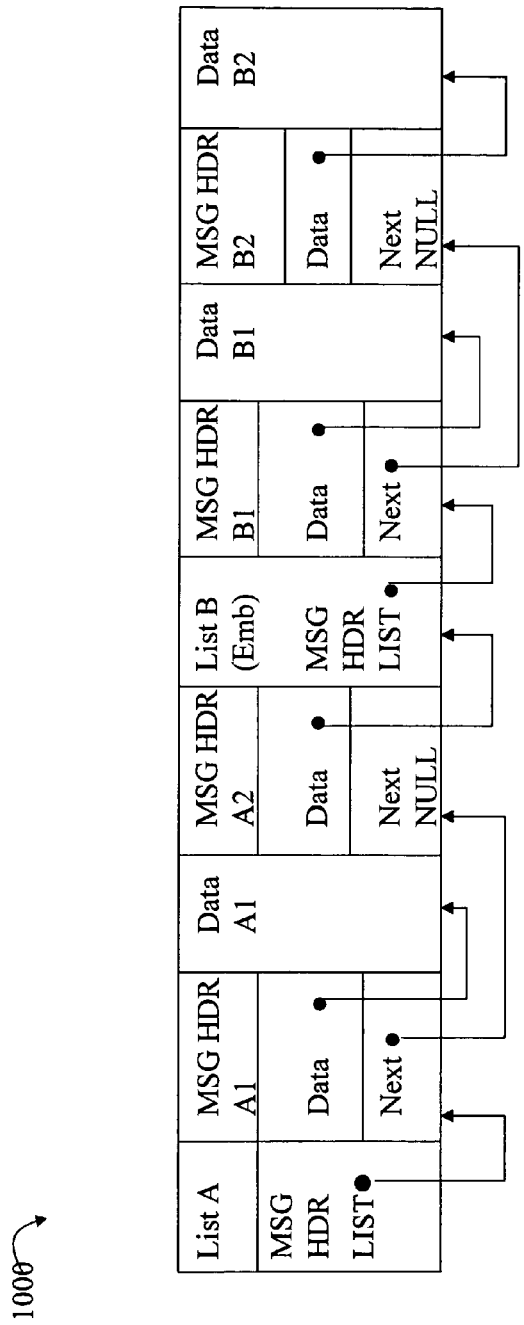
FIGS. 16A, 16B, 17 and 18 are examples illustrating different encoding formats of data and descriptors embedded lists in an embodiment in accordance with techniques herein.

Referring to FIG. 16A, shown is an example illustrating one way in which data may be encoded. The example 1000 represents one encoded data format after marshalling is complete such as prior to transmitting the data in the example 1000 from the client to the server. The example 1000 illustrates one particular format in which the data from the hierarchical structure of input and/or output parameters and associated metadata may be represented as a contiguous stream of data. The data of FIG. 16A may be the result of traversing the hierarchical structure such as using the parallel linear list described above. The example 1000 represents one way in which the data of the hierarchical structure of FIG. 15A may be encoded using a single buffer for both input and output parameters and associated metadata such as data descriptors describing the parameters. The encoding process gathers each of the different descriptors and data portions from the hierarchical structure into a contiguous segment of data. Pointers of the different descriptors may be adjusted to indicate the new locations as offsets in the encoded format. An embodiment may use the single buffer for both input and output parameters and descriptors in connection with the techniques herein, for example, when the underlying intermodule communication mechanism uses shared memory accessible to both the client and server containers. The offsets may be determined using the size fields of the message headers.

In one embodiment, a callback on the client side, such as input-prepare-callback or output-prepare-callback described in the 759 and '822 patent applications, may perform the encoding. When data is returned to the client from the server, another callback on the client side, such as output-post callback, may perform the necessary decoding to unmarshal the encoded data and copy the output data therefrom to the proper locations in the hierarchical structure.

It should be noted that an embodiment using a single buffer for the encoded format and having input and output data and descriptors in a same hierarchical structure may use a single prepare callback which performs encoding for all input data and descriptors and output data and descriptors, and a single post callback which performs decoding upon return to the client container from the server container. In one embodiment, the encoding process may include processing all descriptors (input and output) and copying only the input data. An embodiment may assume that there is no actual data stored in the output data areas described by the output descriptors. Thus, an embodiment may optionally assume the foregoing for efficiency to avoid additional overhead incurred in connection with copying output data.

Figure 16B:
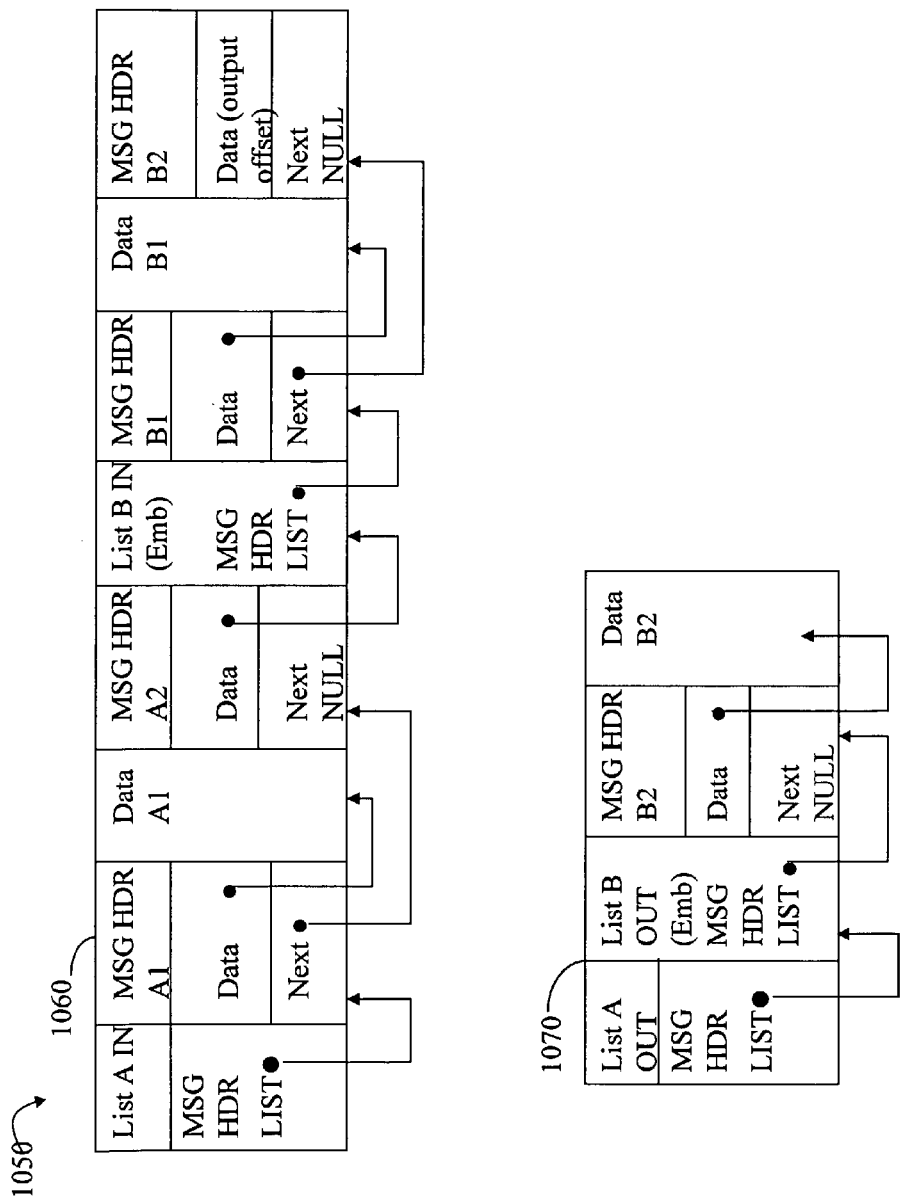

Referring to FIG. 16B, shown is another example illustrating how data may be encoded. The example 1050 represents a second encoded data format that may be used in an embodiment representing the encoded data after marshalling is complete such as prior to transmitting the data in the example 1050 from the client to the server. In this example 1050, an embodiment may have a separate input data area 1060 and output data area 1070 for the encoded data. In this example, the client side may communicate in the input data area 1060 all descriptors (including output data descriptors) and input data. On the server side, the server may perform the processing to copy the output descriptors from the input data area to the output data area 1070 along with any output data transmitted back to the client. An embodiment may use the input prepare callback on the client to perform processing to encode the data as represented in 1060. Output post callback on the client may perform processing to decode the data returned into the proper locations in the hierarchical structure. An embodiment may choose to utilize the encoded format of FIG. 16B, for example, where an alternative mechanism other than shared memory is used for inter-container communication as described in the '759 and '822 patent applications. The output post callback and input prepare callback are described in the '759 and '822 patent applications described elsewhere herein.

Figure 17:
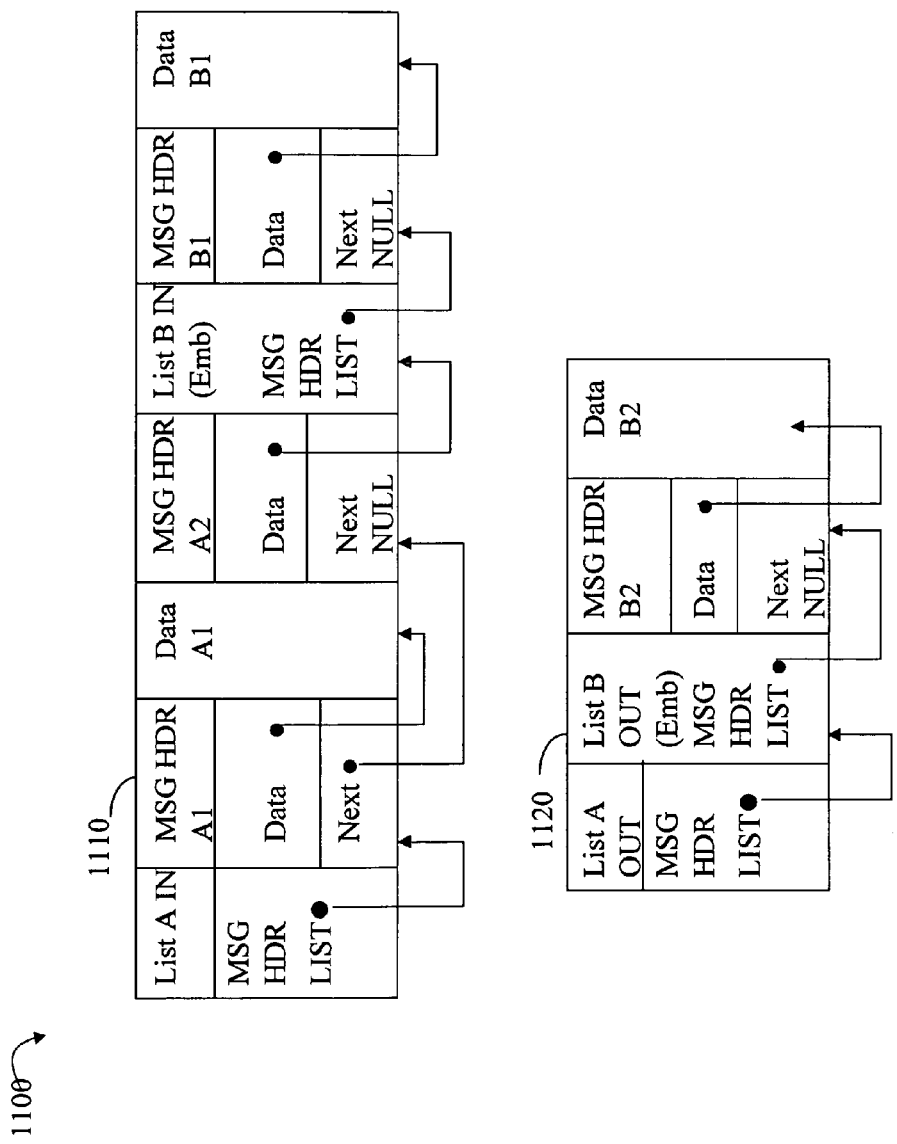

Referring to FIG. 17, shown is an example 1100 illustrating yet another way of how data may be encoded. The example 1150 is similar to that as described in FIG. 16B in that there are separate input and output data areas 1110 and 1120. However, in this example, the output descriptors are communicated using the output data area 1120 and are not included in the input data area 1110 for sending from the client to the server. In this example, input prepare callback on the client may encode the input descriptors and data as represented in 1110, and output prepare callback on the client may encode the output descriptors and data as represented in 1120. An embodiment may not actually copy the output data into the area of 1120 but rather may only encode the output descriptors. It may be assumed, as described above, that the output data locations do not include valid data prior to transmission to the server.

An embodiment may choose to utilize the encoded format of FIG. 17, for example, when shared memory is used for inter-container communication as described in the 759 and '822 patent applications. In such an embodiment, parameter information of 1060 and 1070 may be communicated from the client to the server where area 1070 may include valid output descriptor information and where the output parameter data areas (e.g., denoted as Data B2) do not communicate any valid information. Different layers on the server side may retrieve the appropriate input parameter information from 1060 and output descriptor information from 1070, determine any outputs, and populate the appropriate output data areas (e.g., such as Data B2).

Figure 18:
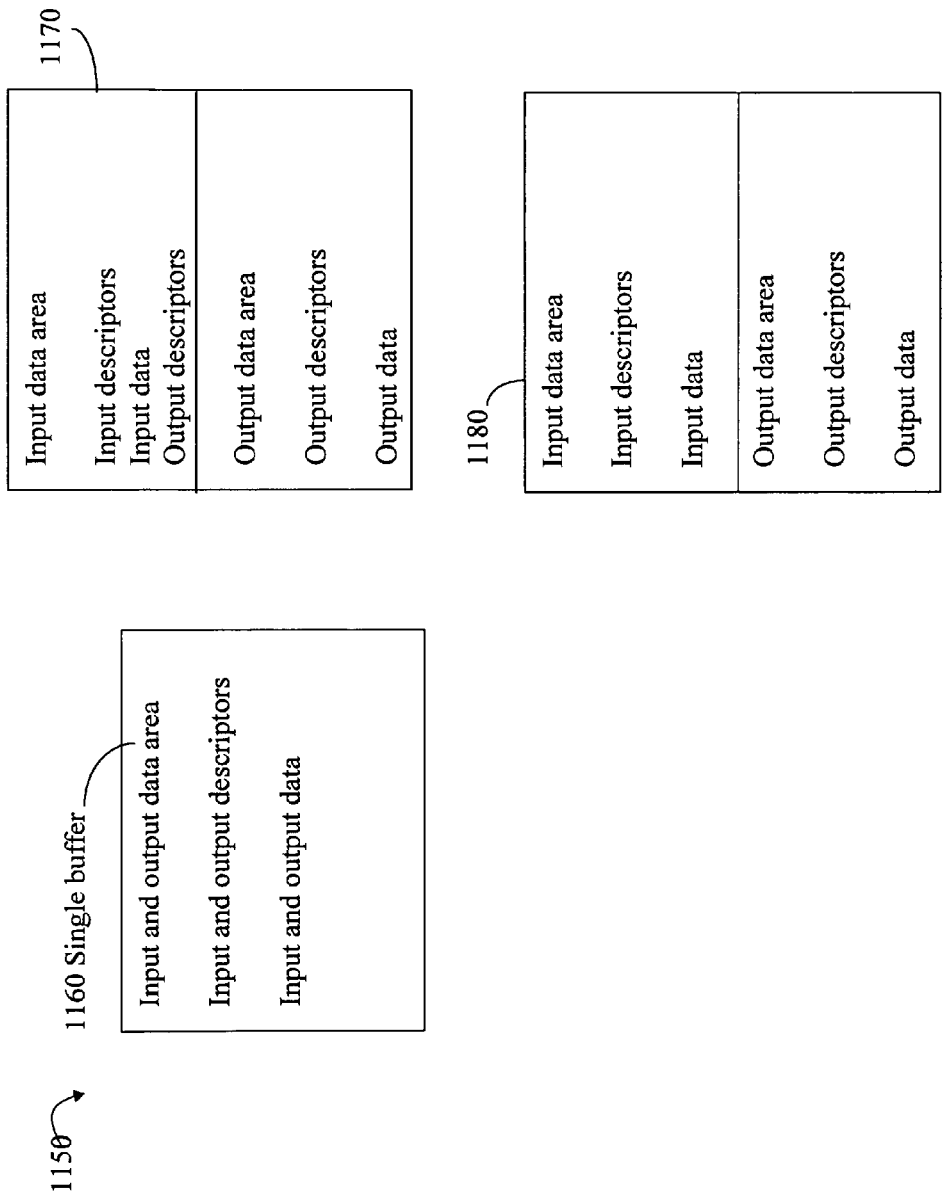

Referring to FIG. 18, shown is an example illustrating more generally different layouts for the data areas as described above. Element 1160 may represent encoded data using a single buffer where input and output data and descriptors may be intermixed. One possible encoded format is as described in connection with FIG. 16A. Element 1170 may represent encoding where the input and output data areas are segregated. However, the output descriptors may be communicated to the server in the input data area. On the server side, the output descriptors may be copied to the output data area. FIG. 16B specifies one possible encoded format for the input and output data areas in accordance with the general representation of 1170. Element 1180 may represent encoding where the input and output data areas are segregated and the output descriptors are communicated to the server from the client via the output data area. FIG. 17 specifies one possible encoded format for the input and output data areas in accordance with the general representation of 1180.

Figure 19A:
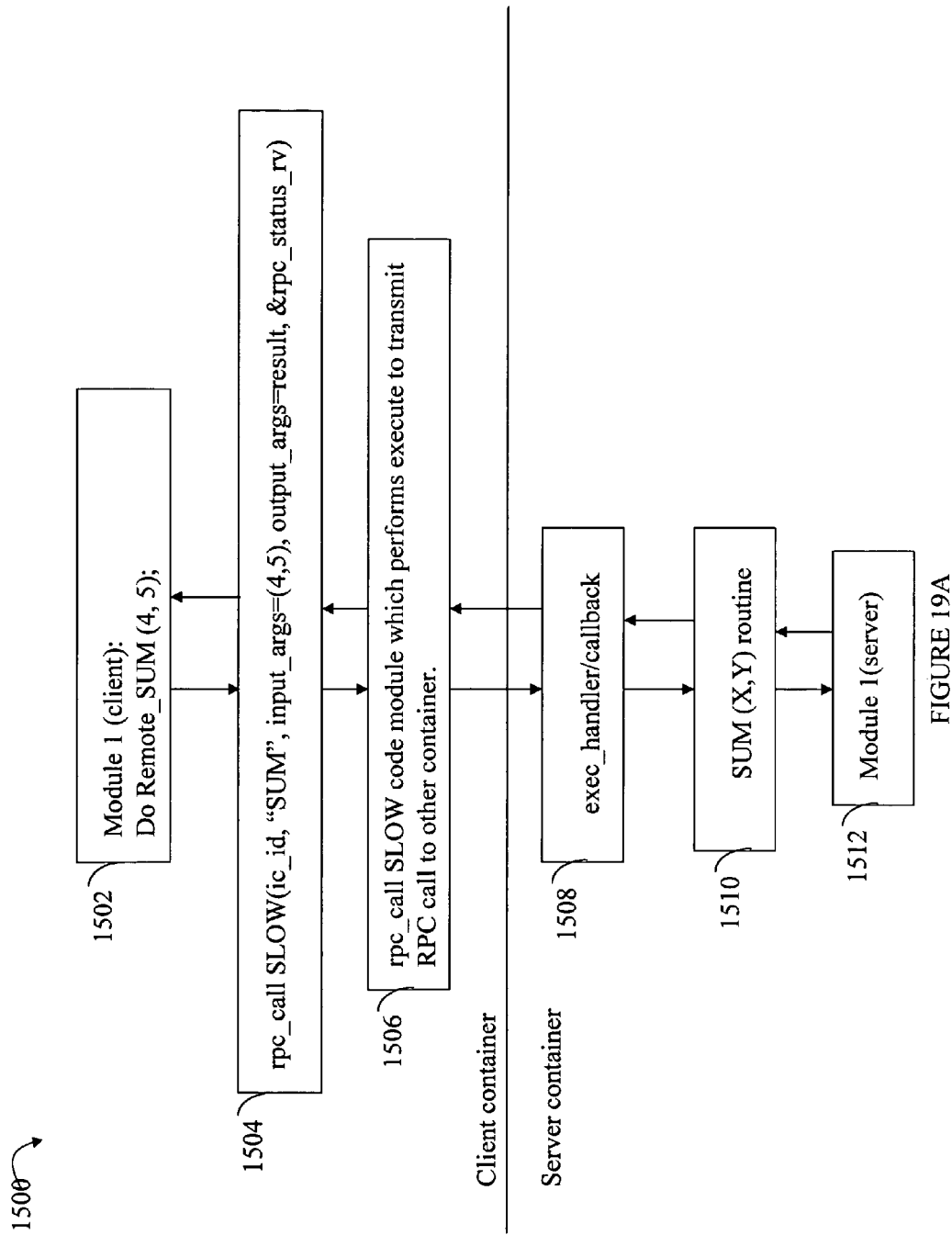
FIGS. 19A, 19B, and 20 illustrate an example of a call chain and associated structures that may be used to represent data and descriptors in an embodiment in accordance with techniques herein.

Referring to FIG. 19A, shown is an example of layers that may be included in a call chain of a command path for issuing a request to a server to perform the registered RPC SUM. In the example 1500, the client container includes a first call represented in 1502 from a module to issue a request to perform an RPC SUM (4,5). The first call, as may be included in user code and represented by 1502, results in a second call represented in 1504. The second call 1504 is an API call as described in connection with FIG. 4. The API call of 1504 may result in one or more other lower levels calls as represented by 1506 in connection with preparing the data for transmission to the server, such as by encoding as described above. Step 1506 may include, for example, performing processing for the execute API call resulting in invocation of the input-prepare callback and the output prepare callback. The input prepare callback may prepare the input data area by copying and encoding the input data and descriptors. The output prepare callback may prepare the output data area by copying and encoding the output data descriptors without copying any output data. Rather, the output data area may be populated with the output descriptors only. The data in the encoded format may be transmitted to the server container for processing by one or more layers on the server side corresponding to those on the client side. The server side call chain includes calls 1508, 1510 and 1512. The return path of the call chain or command is also illustrated from 1512 returning to 1502. Each layer in the call chain for transmitting the request and performing the processing on the server may be denoted by the arrows from 1502 to 1512 and each layer may perform processing with respect to the input and output data areas as described herein. In particular, each layer on the server side may remove its parameter data and descriptor information and pass on the remaining input data and descriptor information to subsequent lower levels in the call chain. Similarly, each layer may perform processing as described herein on the server and client side for the output descriptors and output data.

Figure 19B:
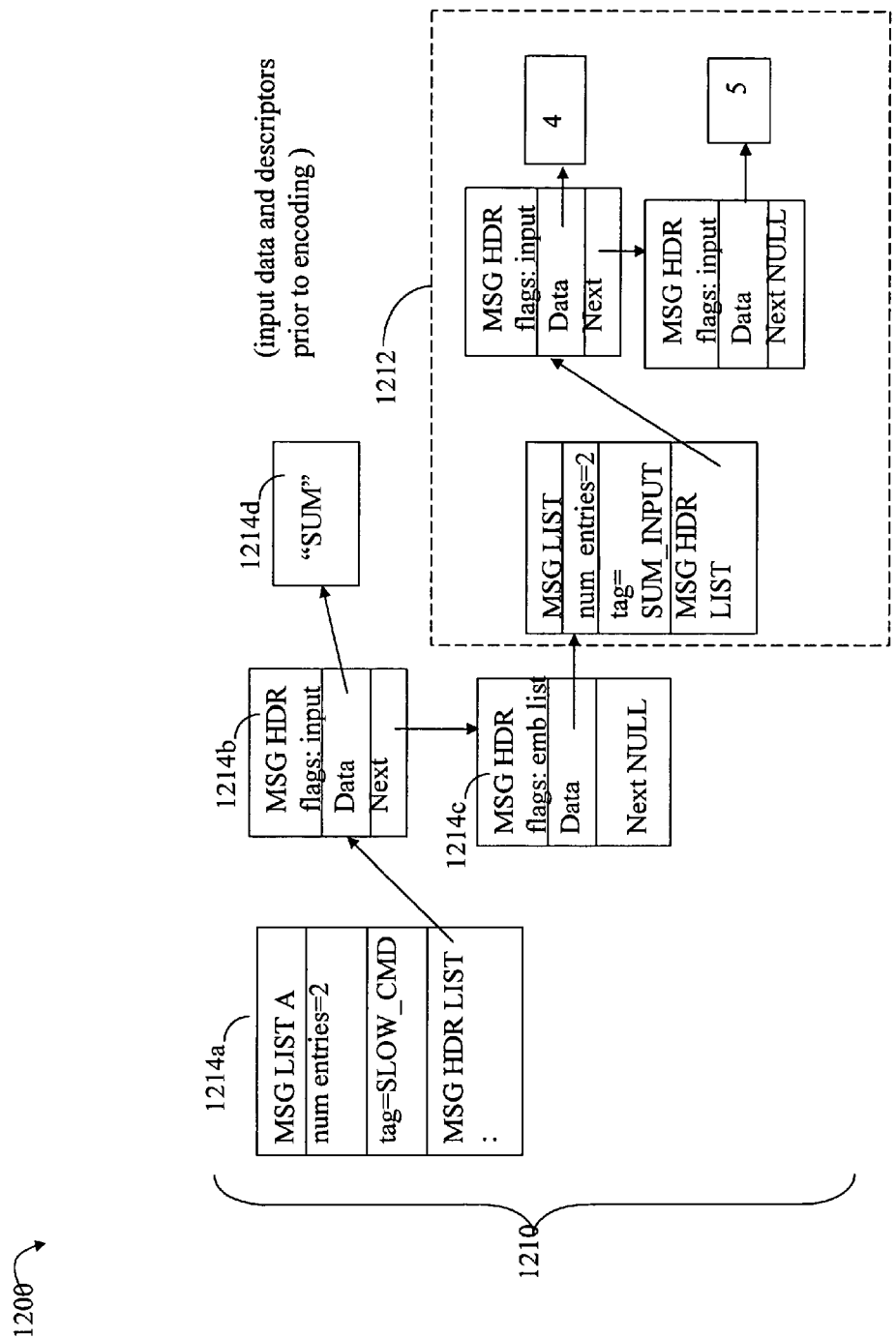

FIG. 19B may represent the input data and descriptors constructed as a hierarchical structure described herein using message lists and message headers with embedded message lists. In the example 1200, element 1212 represents the embedded message list of input data and descriptors for the call 1502 of FIG. 19A. The remaining structures 1214a, 1215b, 1214c and 1214d represent input data and descriptors for the API call in 1504. The data pointer of 1214c may be used to link or chain the embedded message list 1212 of input data information from a higher level in the call chain corresponding to 1502 of FIG. 19A. The example 1200 represents the input data and descriptors prior to encoding. FIG. 19B may represent the format of the input data prior to encoding, for example, by input-prepare callback on the client.

Figure 20:
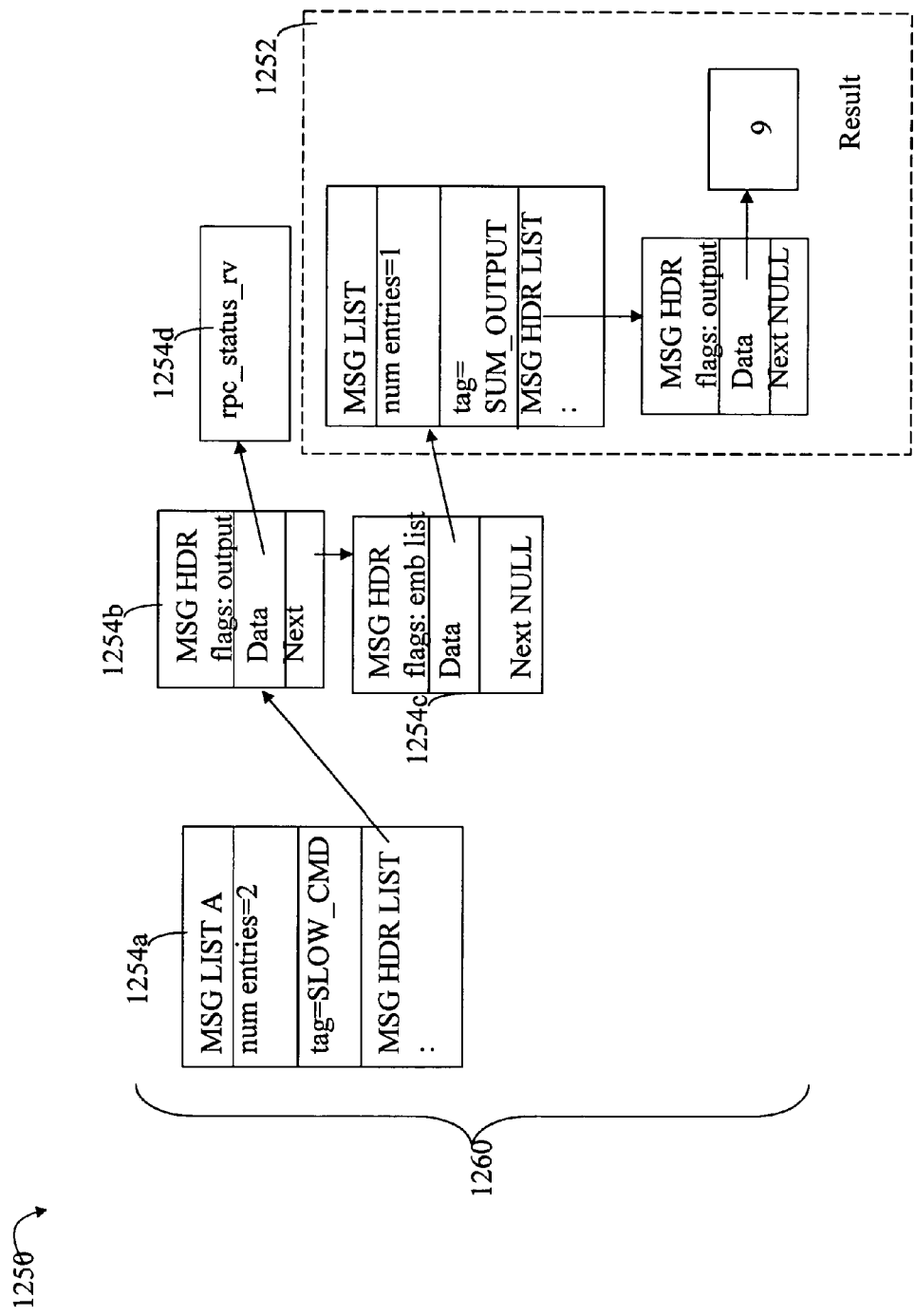

FIG. 20 may represent the output data and descriptors constructed as a hierarchical structure described herein using message lists and message headers with embedded message lists. In the example 1250, element 1252 represents the embedded message list of output data and descriptors for the call 1502 of FIG. 19A. The remaining structures 1254a, 1254b, 1254c, 1254d represent output data and descriptors for the API call of 1504 with the data pointer of 1254c used to link or chain the embedded message list of output data information 1252 from a higher level in the call chain. The example 1250 represents the input data and descriptors in the decoded or unencoded format such as after the client performs decoding upon receiving results from the server. FIG. 20 may represent the format of the output data after decoding processes results from the client, for example, such as may be performed by output-post callback on the client. The output prepare callback may be used to prepare the output data area prior to transmission to the server by copying and encoding the output data descriptors without copying any output data as described above.

An embodiment may provide an API which includes defined interfaces for forming and using the message lists described herein. In one embodiment, such an API may be referred to as a message transport API which may be used in connection with other APIs described herein. As will be appreciated by those skilled in the art, use of the message lists as described herein with embedded message lists may be used to reduce memory copies when passing parameter information from multiple hierarchical levels in a call chain. In an embodiment which does not use the message lists and techniques described above, each level in the call chain on the client side may alternatively allocate a buffer large enough to hold parameter information utilized by the current client side routine and a corresponding server-side routine and also for any parameter information passed to the current level by a calling routine. The current client side routine may copy any parameter information passed to it by a calling routine into the allocated buffer and then pass the buffer on to any next client side routine which is invoked in the call chain. Use of the message lists herein which utilize embedded message lists may reduce processing performed by a called routine since the called routine does not have to perform memory copying of parameter information passed to it by the calling routine. Rather, the called routine may use a pointer to an embedded message list of the parameter information received from the calling routine. In connection with techniques described herein on the client side prior to transmission to another container such as a server container, the chain of embedded message lists (also referred to as the decoded form or format) may be encoded into a contiguous stream which is then communicated to the server. The server may operate on the parameter information in its encoded form or may alternatively decode the parameter information and may operate on the parameter information in its decoded form. In either case, the server may transmit any output parameters to the client in the encoded format where the client may decode the output data in accordance with the decoded format forming a hierarchical structure of parameter information. An embodiment may use a message transport API for operating on the message lists so that the code invoking the message transport API routines is insulated from the different internal encoded and decoded formats that may be used. For example, the server side code may use a message transport API for extracting information from a message list and also populating a message list with output parameter data. As such, the server side code may be insulated from the particular format of the message lists on the server side as well as any changes to the message list formats. The code implementing the message transport API may perform processing in accordance with the particular format utilized. Similarly, the client side code may also use the message transport API. For example, code of the RPC API as described herein on both the client side and server side may utilize the message transport API which may include different APIs for forming the message list and its elements, extracting information from a message list, and the like.

Figure 21:
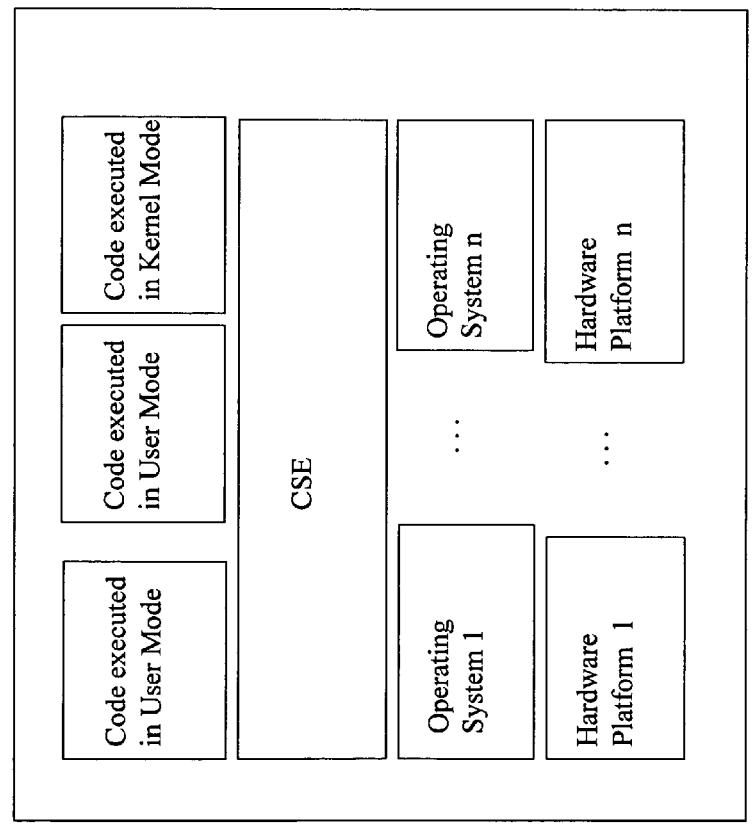
FIG. 21 is an illustration of the different operating systems and hardware platforms that may be included on a data storage system for use with the techniques herein.

Referring now to FIG. 21, shown is a representation illustrating the relationship of the common software environment (CSE) components to other components of the data storage system. In the example 1400, the CSE includes the API, and other infrastructure code used to interface code of the API to other operating system components. The CSE may isolate any code in user space (code executing in user mode) or kernel space (code executing in kernel mode) above the CSE from dependencies in the operating system or hardware platform. Furthermore, code written using the API of the CSE may be executed in either user or kernel mode as illustrated herein.

As will be appreciated by those skilled in the art, the techniques herein may be used for existing code as well as newly developed code. For existing code, the platform specific calls may be determined and replaced with appropriate API calls. The API code may be modified to provided the necessary support for any additional platform. Similarly, new code may be developed using the API calls which may utilize the platform specific primitives while isolating the code from these platform dependencies.

It should be noted that a code module making calls into the API in accordance with techniques herein may use a first version of the API code when executing in user mode and a second version of the API code when executing in kernel mode by linking to the appropriate version. In other words, the code module makes the same API call (e.g., same defined interface) when executing in user mode and kernel mode so that the same code module can be executed in user mode and kernel mode without modification. However, the body of code included in the API which is executed as a result of the API call may vary in accordance with whether executing in user mode or kernel mode.

Although the techniques herein are illustrated in an exemplary embodiment of a data storage system, the techniques herein may be used in connection with code executing on any computer processor on any system. Additionally, although the API provided is included in a common software environment to provide a common interface for code that executes in user and kernel mode, the techniques described herein for intermodule or communication between user mode modules or containers (e.g. such as processes) may be used independently and separately from the techniques described herein for intermodule communication between a user container including code executing in user mode and a kernel container including code executing in kernel mode (e.g, U-K and/or K-U). As an example, an embodiment may use the techniques described herein for one or more of performing RPCs and associated inter-container communications for U-U, U-K and/or K-U. Although a common API may be used as described herein, it will be appreciated by those skilled in the art that techniques for one or more of U-U, U-K and/or K-U communications may or may not be implemented using a common API. Additionally, as described herein, the same API may be used when the called and calling routine are also in the same address space or container where the code of the RPC API described herein may detect this and use a local procedure call or other mechanism that may be available in an embodiment. Thus, code which uses the RPC API herein may be used when the called and calling routines are in the same container as well as different containers and the code of the API may perform appropriate processing for each case.

It should be noted that an embodiment may perform processing as needed to synchronize access to different resources, such as used by the client and server containers, in connection with performing processing described herein.

An embodiment may implement the techniques herein using code executed by a computer processor. For example, an embodiment may implement the techniques herein using code which is executed by a processor of the data storage system. As will be appreciated by those skilled in the art, the code may be stored on the data storage system on any one of a computer-readable medium having any one of a variety of different forms including volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired information and which can accessed by a data storage system processor.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for performing a remote procedure call comprising:
   receiving, at a server container and using a processor, a first request from a client container to obtain remote procedure call configuration information identifying a registered remote procedure call in said server container;
   sending, using a processor, said remote procedure call configuration information from said server container to said client container, said remote procedure call configuration information including a state identifier having a first value and an identifier of a remote procedure call descriptor, said first value of said state identifier being associated with a global configuration state of remote procedure call configuration information for the server container at a first point in time when said first request is processed by said server container, said remote procedure call descriptor describing an instance of a remote procedure call object for said registered remote procedure call;
   receiving, from said client container at said server container and using a processor, a plurality of second requests, wherein each of said plurality of second requests is issued as a separate call from said client container to said server container in accordance with an application programming interface, wherein each of said plurality of second requests is a request to perform said registered remote procedure call and includes said remote procedure call configuration information previously returned to the client container in response to the first request; and
   performing, by said server container and using a processor, processing for each of said plurality of second requests, said processing for each of said plurality of second requests including successfully validating said identifier of said remote procedure call descriptor using said state identifier prior to performing said registered remote procedure call, wherein said validating includes determining, using said first value of the identifier, whether there have been any changes to the global configuration state of remote procedure call configuration for the server container since said first point in time.

2. The method of claim 1, wherein said state identifier has said first value at the first point in time representing the global configuration state of remote procedure call configuration information for the server container at the first point in time, wherein, when processing said each second request, said state identifier has a second value at the second point in time representing the global configuration state of remote procedure call configuration information for the server container at the second point in time, and wherein said validating for said each second request includes comparing said first value of said state identifier to said second value of the state identifier.

3. The method of claim 2, wherein said processing performed by the server container for said each second request further includes:
   returning a status value to the client container indicating a state change without performing the registered remote procedure call if said comparing determines that the first value of the state identifier is not equal to the second value of the state identifier, said state change indicating a change to the global configuration state of the remote procedure call configuration information for the server container.

4. The method of claim 3, wherein if said comparing determines that the first value and the second value are equal, the method further includes performing the registered remote procedure call.

5. The method of claim 3, wherein each event for unregistering a currently registered remote procedure call for the server container results in said state identifier being updated to a unique value thereby indicating a change to the global configuration state of the remote procedure call information for the server container.

6. The method of claim 3, wherein each event for registering a remote procedure call for the server container does not result in modification to said state identifier.

7. The method of claim 3, wherein responsive to receiving a status value indicating said state change, said client container issues a third request at a third point in time to obtain the remote procedure call configuration information identifying the registered remote procedure call in said server container, said remote procedure call configuration information returned to the client at the third point in time including said state identifier having a third value associated with the global configuration state of remote procedure call information for the server container at the third point in time.

8. The method of claim 1, wherein said client container stores the remote procedure call configuration information received in response to the first request to a location, and wherein the client container retrieves said remote procedure call configuration information from the location prior to including the remote procedure call configuration information in each of the plurality of second requests.

9. The method of claim 1, wherein said identifier is an address of an object in an address space of said server container.

10. The method of claim 9, wherein said object includes a field identifying an address of code to which control is transferred in response to receiving a request to perform said registered remote procedure call.

11. The method of claim 1, wherein said remote procedure call is performed by transferring execution control to an address obtained from said remote procedure call descriptor.

12. The method of claim 1, wherein said client container includes code executing in a first address space and said server container includes code executing in a second address space different than said first address space.

13. The method of claim 1, wherein said first request includes a string identifying a name of said registered remote procedure call, and performing said first request includes accessing a list of remote procedure call descriptors to determine whether said string identifies a name of a registered remote procedure call of said server container.

14. A non-transitory computer readable medium comprising code thereon for performing a remote procedure call, the non-transitory computer readable medium comprising code that, when executed by a processor, performs a method comprising for:
　receiving, at a server container, a first request from a client container to obtain remote procedure call configuration information identifying a registered remote procedure call in said server container;
　sending said remote procedure call configuration information from said server container to said client container, said remote procedure call configuration information including a state identifier having a first value and an identifier of a remote procedure call descriptor, said first value of said state identifier being associated with a global configuration state of remote procedure call configuration information for the server container at a first point in time when said first request is processed by said server container, said remote procedure call descriptor describing an instance of a remote procedure call object for said registered remote procedure call;
　receiving, from said client container at said server container, a plurality of second requests, wherein each of said plurality of second requests is issued as a separate call from said client container to said server container in accordance with an application programming interface, wherein each of said plurality of second requests is a request to perform said registered remote procedure call and includes said remote procedure call configuration information previously returned to the client container in response to the first request; and
　performing, by said server container, processing for each of said plurality of second requests, said processing for each of said plurality of second requests including successfully validating said identifier of said remote procedure call descriptor using said state identifier prior to performing said registered remote procedure call, wherein said validating includes determining, using said first value of the identifier, whether there have been any changes to the global configuration state of remote procedure call configuration for the server container since said first point in time.

15. The non-transitory computer readable medium of claim 14, wherein said state identifier has said first value at the first point in time representing the global configuration state of remote procedure call configuration information for the server container at the first point in time, wherein, when processing said each second request, said state identifier has a second value at the second point in time representing the global configuration state of remote procedure call configuration information for the server container at the second point in time, and wherein said validating for said each second request includes comparing said first value of said state identifier to said second value of the state identifier.

16. The non-transitory computer readable medium of claim 15, wherein said processing performed by the server container for said each second request further includes:
　returning a status value to the client container indicating a state change without performing the registered remote procedure call if said comparing determines that the first value of the state identifier is not equal to the second value of the state identifier, said state change indicating a change to the global configuration state of the remote procedure call configuration information for the server container.

17. The non-transitory computer readable medium of claim 15, wherein if said comparing determines that the first value and the second value are equal, the method further includes performing the registered remote procedure call.

18. The non-transitory computer readable medium of claim 15, wherein each event for unregistering a currently registered remote procedure call for the server container results in said state identifier being updated to a unique value thereby indicating a change to the global configuration state of the remote procedure call information for the server container.

19. The non-transitory computer readable medium of claim 15, wherein each event for registering a remote procedure call for the server container does not result in modification to said state identifier.

20. The non-transitory computer readable medium of claim 15, wherein responsive to receiving a status value indicating said state change, said client container issues a third request at a third point in time to obtain the remote procedure call configuration information identifying the registered remote procedure call in said server container, said remote procedure call configuration information returned to the client at the third point in time including said state identifier having a third value associated with the global configuration state of remote procedure call information for the server container at the third point in time.

* * * * *